US010708919B2

(12) United States Patent
Subramanian et al.

(10) Patent No.: US 10,708,919 B2
(45) Date of Patent: Jul. 7, 2020

(54) TECHNIQUES AND APPARATUSES FOR BEAM MANAGEMENT TO OVERCOME MAXIMUM PERMISSIBLE EXPOSURE CONDITIONS

(71) Applicant: QUALCOMM Incorporated, San Diego, CA (US)

(72) Inventors: Sundar Subramanian, San Diego, CA (US); Muhammad Nazmul Islam, Edison, NJ (US); Jianghong Luo, Skillman, NJ (US); Ashwin Sampath, Skillman, NJ (US); Junyi Li, Chester, NJ (US); Juergen Cezanne, Ocean Township, NJ (US); Bilal Sadiq, Basking Ridge, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/153,509

(22) Filed: Oct. 5, 2018

(65) Prior Publication Data
US 2019/0141692 A1    May 9, 2019

Related U.S. Application Data

(60) Provisional application No. 62/582,749, filed on Nov. 7, 2017.

(51) Int. Cl.
*H04W 72/04*    (2009.01)
*H04L 5/00*    (2006.01)
(Continued)

(52) U.S. Cl.
CPC .......... *H04W 72/046* (2013.01); *H04B 7/063* (2013.01); *H04B 7/0695* (2013.01);
(Continued)

(58) Field of Classification Search
CPC ........... H04W 72/046; H04W 72/0406; H04W 72/0446; H04W 72/0413; H04L 5/0048
See application file for complete search history.

(56) References Cited

U.S. PATENT DOCUMENTS 10,425,139 B2 *  9/2019  Guo ..................... H04B 7/0695
2013/0182683 A1 *  7/2013  Seol .................... H04W 72/046
                                                              370/335
(Continued)

OTHER PUBLICATIONS

Huawei et al., "Beam Indication for Control and Data Channels", 3GPP Draft, R1-1718238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341420, 8 Pages, Retrieved from the Internet:URL:http://www.3gpp.org/ftp/Meetings_3GPP_SYNC/RAN1/Docs/ [retrieved on Oct. 8, 2017].
(Continued)

*Primary Examiner* — Rasheed Gidado
(74) *Attorney, Agent, or Firm* — Nerrie M. Zohn

(57) ABSTRACT

When a first node is subject to a maximum permissible exposure (MPE) condition, it may be beneficial for the first node to signal, to a second node, an uplink beam to be used for communications and/or one or more properties of the uplink beam. For example, the first node may signal a downlink beam, from a first reciprocal beam pair, and an uplink beam, from a second reciprocal beam pair, to be used for communications, and/or may signal one or more properties of the uplink beam and/or the downlink beam. Additionally, or alternatively, the second node may transmit, to the first node, a signaling state (e.g., a transmission configuration indication (TCI) state) that indicates properties to be used to configure an uplink beam and/or a downlink beam. In this way, the first node and the second node may (Continued)

configure beams in a manner that accounts for MPE limitations.

38 Claims, 13 Drawing Sheets

(51) Int. Cl.
  *H04B 7/06* (2006.01)
  *H04B 7/08* (2006.01)
(52) U.S. Cl.
  CPC .......... *H04B 7/088* (2013.01); *H04L 5/0048* (2013.01); *H04W 72/0406* (2013.01)

(56) References Cited

U.S. PATENT DOCUMENTS

| | | | | |
|---|---|---|---|---|
| 2017/0302341 | A1* | 10/2017 | Yu | H04B 7/0639 |
| 2018/0123650 | A1* | 5/2018 | Yu | H01Q 25/002 |
| 2018/0367374 | A1* | 12/2018 | Liu | H04W 76/18 |
| 2018/0375556 | A1* | 12/2018 | Wang | H04B 7/061 |
| 2019/0253116 | A1* | 8/2019 | Priyanto | H04B 7/0617 |
| 2019/0289476 | A1* | 9/2019 | Chen | H04L 41/0806 |

OTHER PUBLICATIONS

International Search Report and Written Opinion—PCT/US2018/054962—ISA/EPO—dated Jan. 7, 2019.

Mediatek Inc: "DL and UL Beam Management", 3GPP Draft, R1-1718333_Beamindication_ULBM_Final, 3rd Generation Partnership Project (3GPP), Mobile Competence Centre, 650, Route Des Lucioles, F-06921 Sophia-Antipolis Cedex, France, vol. RAN WG1, No. Prague, Czechia, Oct. 9, 2017-Oct. 13, 2017, Oct. 3, 2017 (Oct. 3, 2017), XP051352958, 7 Pages, Retrieved from the Internet: URL:http://www.3gpp.org/ftp/tsg_ran/WG1_RL1/TSGR1_90b/Docs/ [retrieved on Oct. 3, 2017].

QUALCOMM Incorporated: "PRACH Procedure Considerations", 3GPP Draft, R1-1718532 PRACH Procedure Considerations, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341714, 13 Pages, Retrieved from the Internet: URL:http://www.3gpp.org/ftp/Meetings_3GPP_SYNC/RAN1/Docs/ [retrieved on Oct. 8, 2017].

Samsung: "On Beam Management, Measurement and Reporting", 3GPP Draft, R1-1717605_V6, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-OCt. 13, 2017, Oct. 8, 2017 (Oct. 8, 2017), XP051340791, 16 Pages, Retrieved from the Internet: URL:http://www.3gpp.org/ftp/Meetings_3GPP_SYNC/RAN1/Docs/ [retrieved on Oct. 8, 2017].

* cited by examiner

TECHNIQUES AND APPARATUSES FOR BEAM MANAGEMENT TO OVERCOME MAXIMUM PERMISSIBLE EXPOSURE CONDITIONS

CROSS-REFERENCE TO RELATED APPLICATIONS UNDER 35 U.S.C. § 119

This application claims priority to U.S. Provisional Patent Application No. 62/582,749, filed on Nov. 7, 2017, entitled "TECHNIQUES AND APPARATUSES FOR BEAM MANAGEMENT TO OVERCOME MAXIMUM PERMISSIBLE EXPOSURE CONDITIONS," which is hereby expressly incorporated by reference herein.

BACKGROUND

Field

Aspects of the present disclosure generally relate to wireless communication, and more particularly to techniques and apparatuses for beam management to overcome maximum permissible exposure conditions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some aspects, a first node and a second node may be capable of communicating via one or more mmWave beams, and a communication via a mmWave beam may take multiple different paths to reach a receiver. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body, sometimes referred to as maximum permissible exposure (MPE). When the first node is subject to an MPE condition, a downlink beam may be suitable for use by the first node to communicate with the second node, but a corresponding uplink beam in the same reciprocal beam pair may not be permitted for use due to the MPE condition.

When a first node is subject to an MPE condition, it may be beneficial for the first node to signal, to a second node, an uplink beam to be used for communications and/or one or more properties of the uplink beam. In some aspects, the uplink beam may not form a reciprocal beam pair with the downlink beam to be used for communications. In this case, the first node may signal a downlink beam, from a first reciprocal beam pair, and an uplink beam, from a second reciprocal beam pair, to be used for communications, and/or may signal one or more properties of the uplink beam and/or the downlink beam. Additionally, or alternatively, the second node may transmit, to the first node, a signaling state (e.g., a transmission configuration indication (TCI) state) that indicates properties to be used to configure an uplink beam and/or a downlink beam. In this way, the first node and the second node may configure beams in a manner that accounts for MPE limitations.

In an aspect of the disclosure, a method, a node, an apparatus, and a computer program product are provided.

In some aspects, the method may be performed by a first node. The method may include determining an uplink beam as a candidate for communicating with a second node; transmitting an indication of the uplink beam to the second node; and transmitting an indication of a reference signal associated with a beam that is quasi co-located with the uplink beam, wherein the reference signal was previously communicated via the beam.

In some aspects, the method may be performed by a second node. The method may include receiving a plurality of uplink reference signals, via a corresponding plurality of uplink beams, from a first node; determining an uplink beam, of the plurality of uplink beams, based at least in part on the plurality of uplink reference signals; and transmitting, to the first node, an indication of the uplink beam and one or more properties of a quasi co-located (QCL) beam to be used to configure the uplink beam.

In some aspects, the method may be performed by a node. The method may include determining one or more first properties of a first quasi co-located (QCL) beam to be used to configure an uplink beam; determining one or more second properties of a second QCL beam to be used to configure a downlink beam; and transmitting a signaling state that indicates the uplink beam, the one or more first properties of the first QCL beam, the downlink beam, and the one or more second properties of the second QCL beam.

In some aspects, the method may be performed by a first node. The method may include receiving a signaling state that indicates one or more first properties of a first quasi co-located (QCL) beam to be used to configure an uplink beam; configuring the uplink beam based at least in part on the one or more first properties indicated in the signaling state; and communicating with a second node using the uplink beam.

In some aspects, a first node may include a memory and at least one processor coupled to the memory. The memory and the at least one processor may be configured to determine an uplink beam as a candidate for communicating with a second node; transmit an indication of the uplink beam to the second node; and transmit an indication of a reference signal associated with a beam that is quasi co-located with the uplink beam, wherein the reference signal was previously communicated via the beam.

In some aspects, a second node may include a memory and at least one processor coupled to the memory. The memory and the at least one processor may be configured to receive a plurality of uplink reference signals, via a corresponding plurality of uplink beams, from a first node; determine an uplink beam, of the plurality of uplink beams, based at least in part on the plurality of uplink reference signals; and transmit, to the first node, an indication of the uplink beam and one or more properties of a quasi co-located (QCL) beam to be used to configure the uplink beam.

In some aspects, a node may include a memory and at least one processor coupled to the memory. The memory and the at least one processor may be configured to determine one or more first properties of a first quasi co-located (QCL) beam to be used to configure an uplink beam; determine one or more second properties of a second QCL beam to be used to configure a downlink beam; and transmit a signaling state that indicates the uplink beam, the one or more first properties of the first QCL beam, the downlink beam, and the one or more second properties of the second QCL beam.

In some aspects, a first node may include a memory and at least one processor coupled to the memory. The memory and the at least one processor may be configured to receive a signaling state that indicates one or more first properties of a first quasi co-located (QCL) beam to be used to configure an uplink beam; configure the uplink beam based at least in part on the one or more first properties indicated in the signaling state; and communicate with a second node using the uplink beam.

In some aspects, a first apparatus may include means for determining an uplink beam as a candidate for communicating with a second apparatus; means for transmitting an indication of the uplink beam to the second apparatus; and means for transmitting an indication of a reference signal associated with a beam that is quasi co-located with the uplink beam, wherein the reference signal was previously communicated via the beam.

In some aspects, a second apparatus may include means for receiving a plurality of uplink reference signals, via a corresponding plurality of uplink beams, from a first apparatus; means for determining an uplink beam, of the plurality of uplink beams, based at least in part on the plurality of uplink reference signals; and means for transmitting, to the first apparatus, an indication of the uplink beam and one or more properties of a quasi co-located (QCL) beam to be used to configure the uplink beam.

In some aspects, the apparatus may include means for determining one or more first properties of a first quasi co-located (QCL) beam to be used to configure an uplink beam; means for determining one or more second properties of a second QCL beam to be used to configure a downlink beam; and means for transmitting a signaling state that indicates the uplink beam, the one or more first properties of the first QCL beam, the downlink beam, and the one or more second properties of the second QCL beam.

In some aspects, a first apparatus may include means for receiving a signaling state that indicates one or more first properties of a first quasi co-located (QCL) beam to be used to configure an uplink beam; means for configuring the uplink beam based at least in part on the one or more first properties indicated in the signaling state; and means for communicating with a second apparatus using the uplink beam.

In some aspects, the computer program product may include a non-transitory computer-readable medium storing one or more instructions. The one or more instructions, when executed by one or more processors of a first node, may cause the one or more processors to determine an uplink beam as a candidate for communicating with a second node; transmit an indication of the uplink beam to the second node; and transmit an indication of a reference signal associated with a beam that is quasi co-located with the uplink beam, wherein the reference signal was previously communicated via the beam.

In some aspects, the computer program product may include a non-transitory computer-readable medium storing one or more instructions. The one or more instructions, when executed by one or more processors of a second node, may cause the one or more processors to receive a plurality of uplink reference signals, via a corresponding plurality of uplink beams, from a first node; determine an uplink beam, of the plurality of uplink beams, based at least in part on the plurality of uplink reference signals; and transmit, to the first node, an indication of the uplink beam and one or more properties of a quasi co-located (QCL) beam to be used to configure the uplink beam.

In some aspects, the computer program product may include a non-transitory computer-readable medium storing one or more instructions. The one or more instructions, when executed by one or more processors of a node, may cause the one or more processors to determine one or more first properties of a first quasi co-located (QCL) beam to be used to configure an uplink beam; determine one or more second properties of a second QCL beam to be used to configure a downlink beam; and transmit a signaling state that indicates the uplink beam, the one or more first properties of the first QCL beam, the downlink beam, and the one or more second properties of the second QCL beam.

In some aspects, the computer program product may include a non-transitory computer-readable medium storing one or more instructions. The one or more instructions, when executed by one or more processors of a first node, may cause the one or more processors to receive a signaling state that indicates one or more first properties of a first quasi co-located (QCL) beam to be used to configure an uplink beam; configure the uplink beam based at least in part on the one or more first properties indicated in the signaling state; and communicate with a second node using the uplink beam.

In some aspects, the method may be performed by a first node. The method may include determining an uplink beam for communicating with a second node; determining a downlink beam as a candidate for communicating with the second node; and transmitting an indication of the uplink beam and the downlink beam to the second node, wherein the uplink beam and the downlink beam are not a reciprocal beam pair.

In some aspects, a first node may include a memory and at least one processor coupled to the memory. The memory and the at least one processor may be configured to determine an uplink beam for communicating with a second node; determine a downlink beam as a candidate for communicating with the second node; and transmit an indication of the uplink beam and the downlink beam to the second node, wherein the uplink beam and the downlink beam are not a reciprocal beam pair.

In some aspects, a first apparatus may include means for determining an uplink beam for communicating with a second apparatus; means for determining a downlink beam as a candidate for communicating with the second apparatus; and means for transmitting an indication of the uplink beam and the downlink beam to the second apparatus, wherein the uplink beam and the downlink beam are not a reciprocal beam pair.

In some aspects, the computer program product may include a non-transitory computer-readable medium storing one or more instructions. The one or more instructions, when executed by one or more processors of a first node, may cause the one or more processors to determine an uplink beam for communicating with a second node; determine a downlink beam as a candidate for communicating with the second node; and transmit an indication of the uplink beam and the downlink beam to the second node, wherein the uplink beam and the downlink beam are not a reciprocal beam pair.

In some aspects, the method may be performed by a second node. The method may include receiving, from a first node, an indication of a candidate uplink beam and a candidate downlink beam, wherein the candidate uplink beam and the candidate downlink beam are not a reciprocal beam pair; determining one or more first properties of a first quasi co-located (QCL) beam to be used to configure an uplink beam based at least in part on the indication of the candidate uplink beam; determining one or more second properties of a second QCL beam to be used to configure a downlink beam based at least in part on the indication of the candidate downlink beam; and transmitting, to the first node, a signaling state that indicates the uplink beam, the one or more first properties of the first QCL beam, the downlink beam, and the one or more second properties of the second QCL beam.

In some aspects, a second node may include a memory and at least one processor coupled to the memory. The memory and the at least one processor may be configured to receive, from a first node, an indication of a candidate uplink beam and a candidate downlink beam, wherein the candidate uplink beam and the candidate downlink beam are not a reciprocal beam pair; determine one or more first properties of a first quasi co-located (QCL) beam to be used to configure an uplink beam based at least in part on the indication of the candidate uplink beam; determine one or more second properties of a second QCL beam to be used to configure a downlink beam based at least in part on the indication of the candidate downlink beam; and transmit, to the first node, a signaling state that indicates the uplink beam, the one or more first properties of the first QCL beam, the downlink beam, and the one or more second properties of the second QCL beam.

In some aspects, a second apparatus may include means for receiving, from a first apparatus, an indication of a candidate uplink beam and a candidate downlink beam, wherein the candidate uplink beam and the candidate downlink beam are not a reciprocal beam pair; means for determining one or more first properties of a first quasi co-located (QCL) beam to be used to configure an uplink beam based at least in part on the indication of the candidate uplink beam; means for determining one or more second properties of a second QCL beam to be used to configure a downlink beam based at least in part on the indication of the candidate downlink beam; and means for transmitting, to the first apparatus, a signaling state that indicates the uplink beam, the one or more first properties of the first QCL beam, the downlink beam, and the one or more second properties of the second QCL beam.

In some aspects, the computer program product may include a non-transitory computer-readable medium storing one or more instructions. The one or more instructions, when executed by one or more processors of a second node, may cause the one or more processors to receive, from a first node, an indication of a candidate uplink beam and a candidate downlink beam, wherein the candidate uplink beam and the candidate downlink beam are not a reciprocal beam pair; determine one or more first properties of a first quasi co-located (QCL) beam to be used to configure an uplink beam based at least in part on the indication of the candidate uplink beam; determine one or more second properties of a second QCL beam to be used to configure a downlink beam based at least in part on the indication of the candidate downlink beam; and transmit, to the first node, a signaling state that indicates the uplink beam, the one or more first properties of the first QCL beam, the downlink beam, and the one or more second properties of the second QCL beam.

Aspects generally include a method, apparatus, system, computer program product, non-transitory computer-readable medium, user equipment, base station, node, first node, second node, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
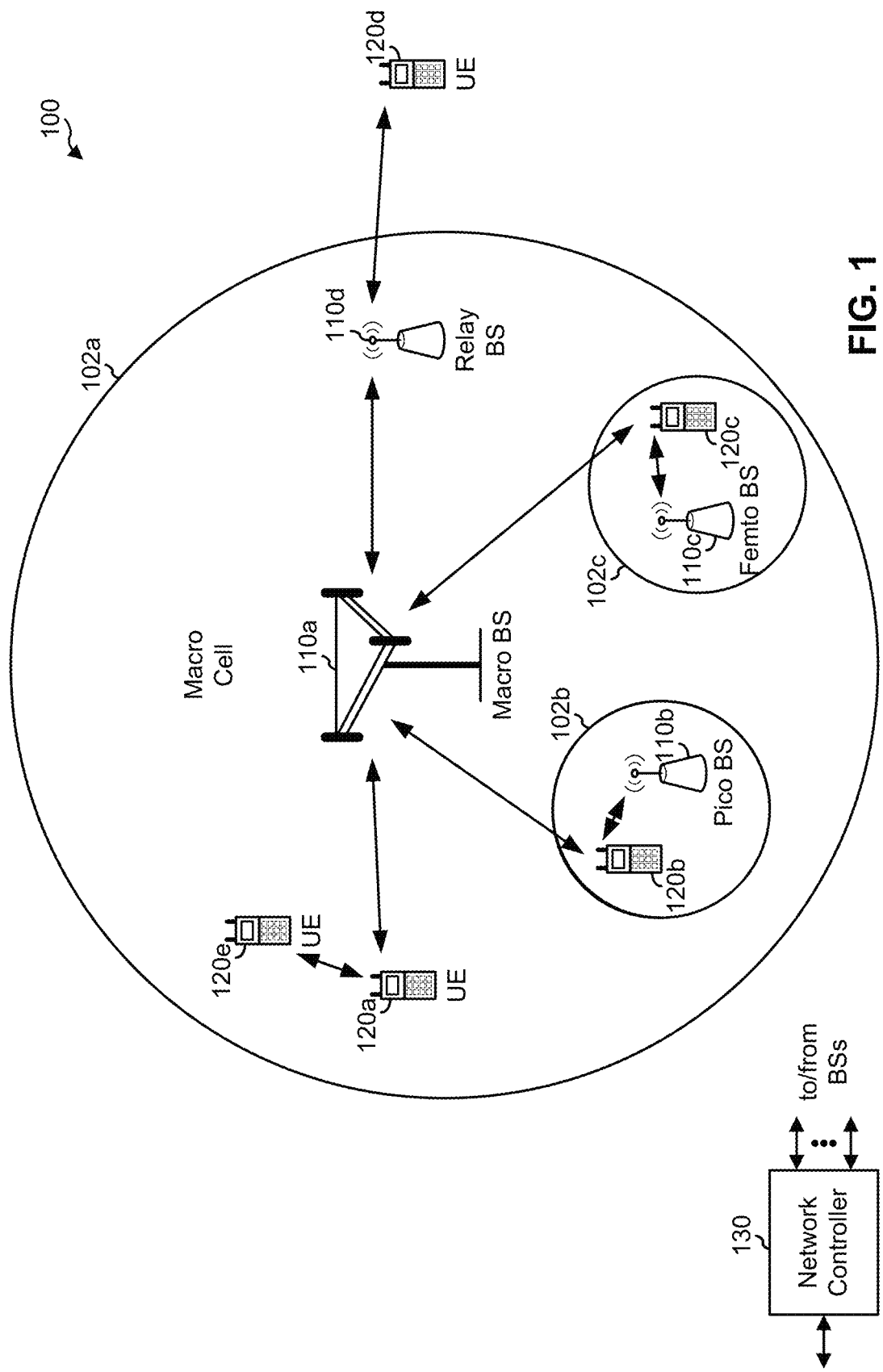
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a base station 110 and/or a UE 120 may be referred to as a node, as described in more detail elsewhere herein.

As indicated above, FIG. 1 is provided merely as an example. Other examples are possible and may differ from what was described with regard to FIG. 1.

Figure 2:
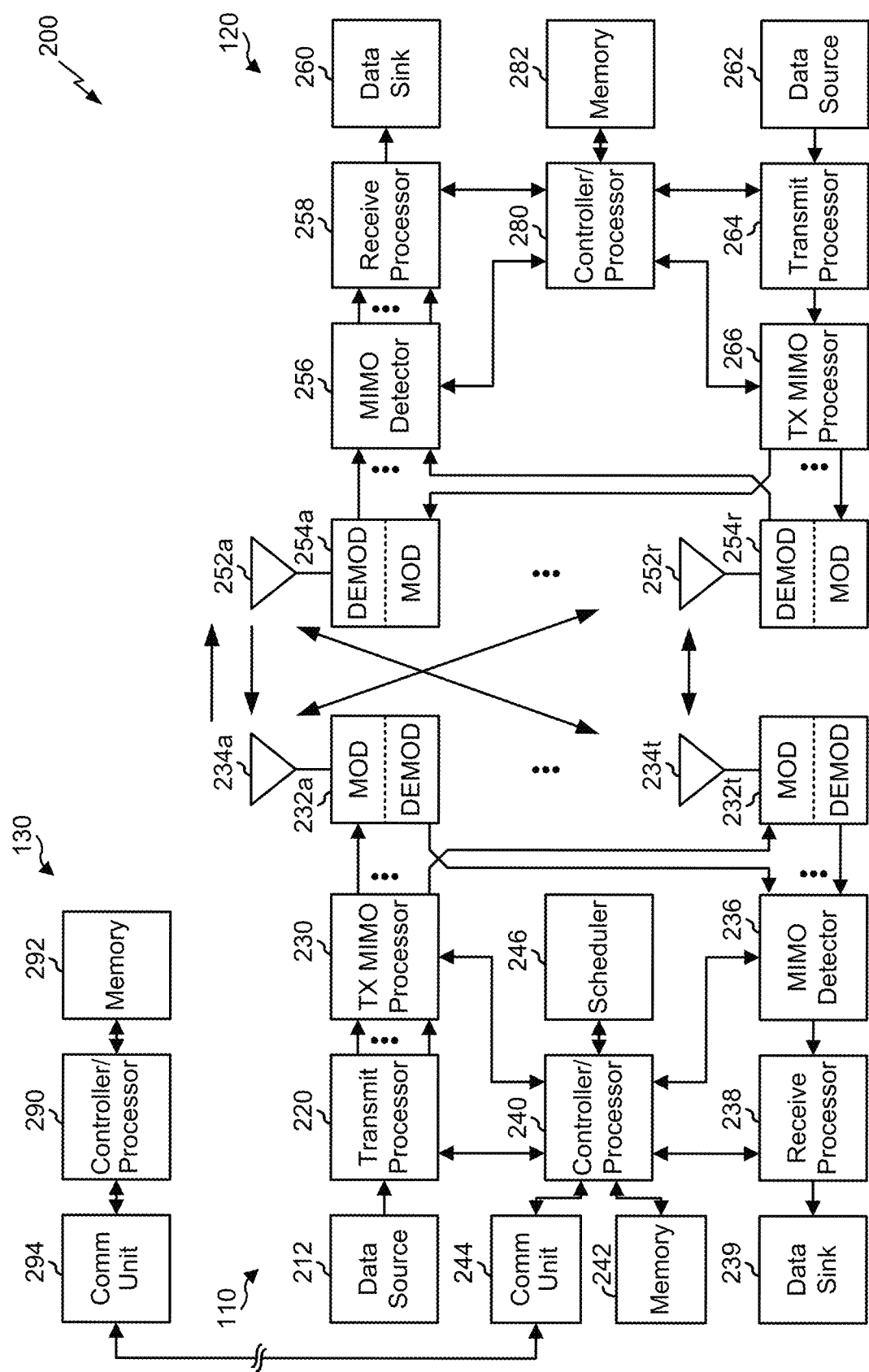
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam management to overcome maximum permissible exposure conditions, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, method 800 of FIG. 8, method 900 of FIG. 9, method 1000 of FIG. 10, method 1100 of FIG. 11, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In some aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
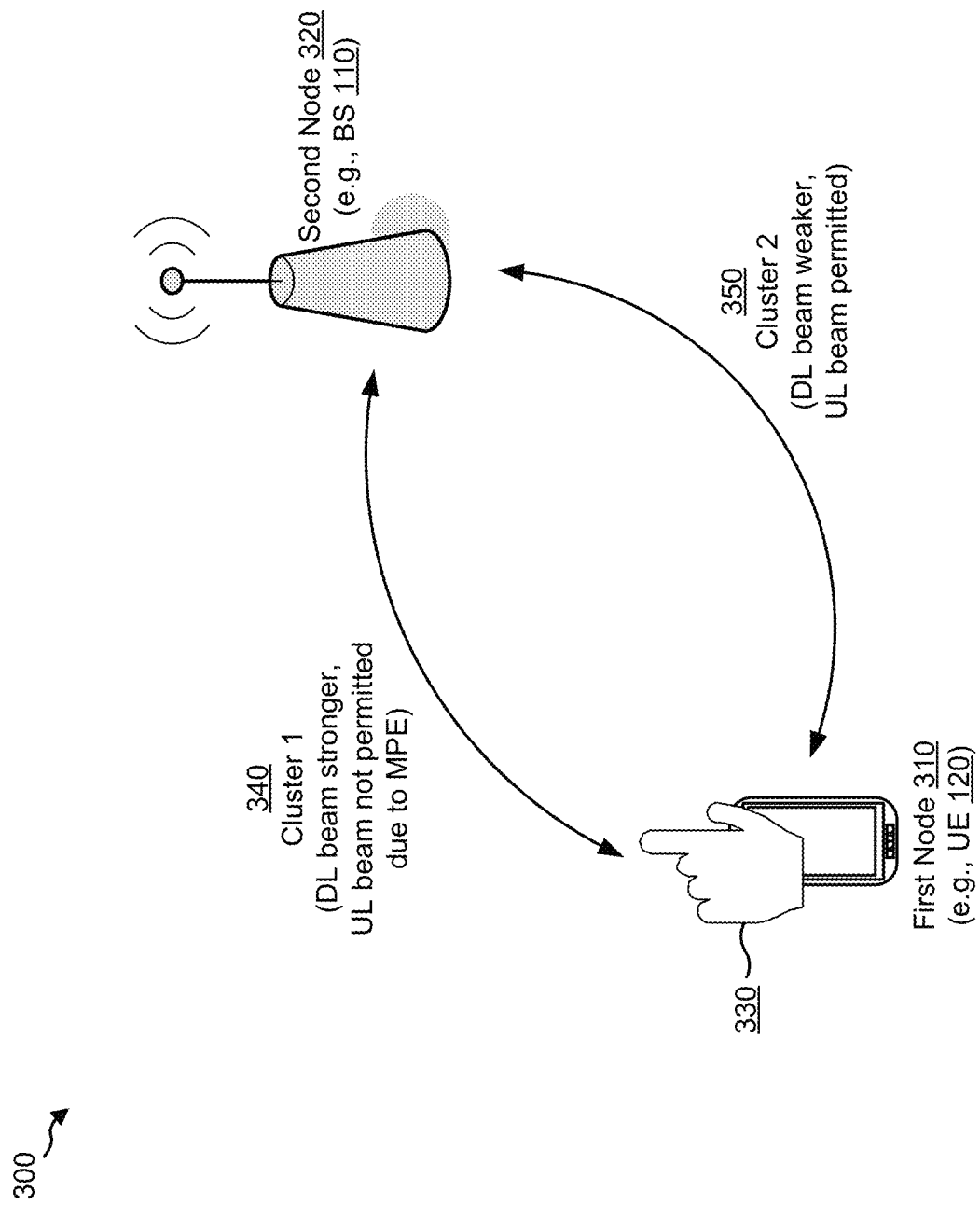
FIGS. 3-5 are diagrams illustrating examples relating to beam management to overcome maximum permissible exposure conditions.

FIG. 3 is a diagram illustrating an example 300 relating to beam management to overcome maximum permissible exposure conditions.

As shown in FIG. 3, a first node 310 (e.g., a UE 120) and a second node 320 (e.g., a base station 110) may be capable of communicating via one or more beams, and a communication via a beam may take multiple different paths, shown as a cluster of paths, to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body. These restrictions are sometimes referred to as maximum permissible exposure (MPE).

As shown by reference number 330, in some aspects, an MPE condition may be due to a hand blocking scenario, where a hand of a user of the first node 310 blocks or obstructs communications to and/or from an antenna subarray of the first node 310, or is otherwise positioned near the antenna subarray. Additionally, or alternatively, the MPE condition may be due to the position of another body part of the user, such as the user's face, head, ear, leg, and/or the like. When the first node 310 is subject to an MPE condition, a downlink beam of a first cluster 340 may be suitable for use by the first node 310 to communicate with the second node 320, but an uplink beam of the first cluster 340 may not be permitted for use due to the MPE condition. In this case, the uplink beam and the downlink beam may form a reciprocal beam pair, where the uplink beam is used for transmission at the first node 310 and reception at the second node 320, and the downlink beam is used for transmission at the second node 320 and reception at the first node 310. In a reciprocal beam pair, the uplink beam and the downlink beam may be in the same direction or path (e.g., with energy radiating in a particular direction more than other directions), but communications on the uplink beam may propagate in the opposite direction as communications on the downlink beam. Further, electrical characteristics of an antenna used to transmit and receive communications via a reciprocal beam pair may be the same, such as gain, radiation pattern, impedance, bandwidth, resonant frequency, polarization, and/or the like, regardless of whether the antenna is transmitting or receiving due to the reciprocity theorem of electromagnetics.

As indicated above, when the first node 310 is subject to an MPE condition, a downlink beam of a reciprocal beam pair may be suitable for use by the first node 310 to receive communications from the second node 320, and may have better beam conditions (e.g., a stronger beam) as compared to other downlink beams, but an uplink beam of the reciprocal beam pair may not be permitted for transmission of communications by the first node 310 due to the MPE condition. For example, the downlink beam may not be subject to an MPE limitation because an EIRP level of a transmission by the second node 320 may subside by the time the transmission reaches the first node 310 and/or the user's hand or other body part. However, the uplink beam may be subject to an MPE limitation because an EIRP level of a transmission by the first node 310 may exceed a permitted EIRP level due to the close proximity of the first node 310 and the user's hand or other body part. This is shown by the first cluster 340.

In such a case, it may be beneficial for the first node 310 to signal, to the second node 320, an uplink beam to be used for communications and/or one or more properties of the uplink beam. In some aspects, the uplink beam may not form a reciprocal beam pair with the downlink beam to be used for communications. For example, the uplink beam may be included in a second cluster 350, and may form a reciprocal beam pair with a downlink beam in the second cluster 350 that is weaker than and/or has less suitable beam conditions than the downlink beam in the first cluster 340. In this case, the first node 310 may signal a downlink beam, from a first reciprocal beam pair (e.g., the first cluster 340), and an uplink beam, from a second reciprocal beam pair (e.g., the second cluster 350), to be used for communications, and/or may signal one or more properties of the uplink beam and/or the downlink beam. Additionally, or alternatively, the second node 320 may transmit, to the first node 310, a signaling state (e.g., a transmission configuration indication (TCI) state) that indicates properties to be used to configure an uplink beam and/or a downlink beam. In this way, the first node 310 and the second node 320 may configure beams in a manner that accounts for MPE limitations.

As indicated above, FIG. 3 is provided as an example. Other examples are possible and may differ from what was described in connection with FIG. 3.

Figure 4:
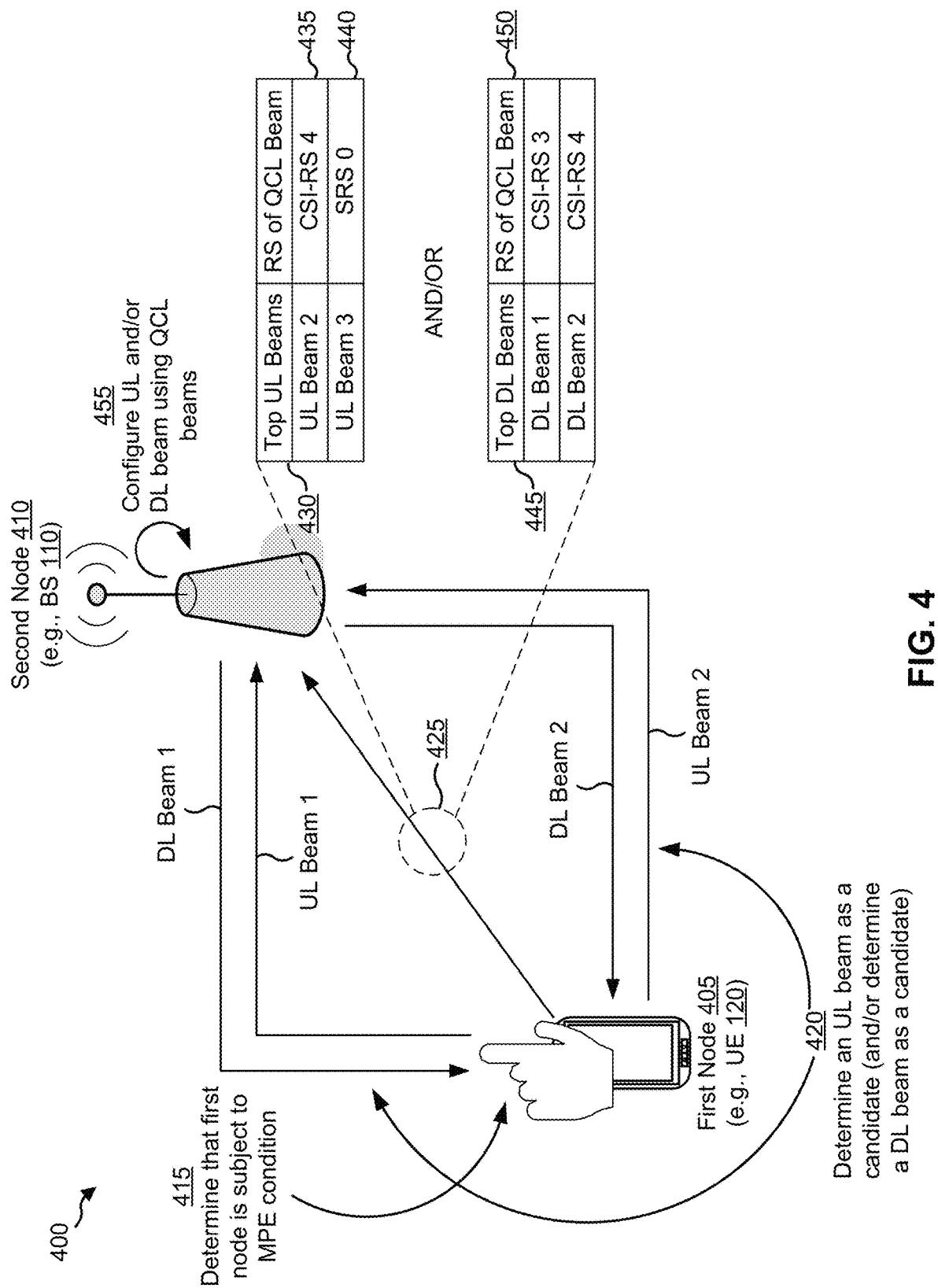

FIG. 4 is a diagram illustrating an example 400 relating to beam management to overcome maximum permissible exposure conditions.

As shown in FIG. 4, a first node 405 may communicate with a second node 410. In some aspects, the first node 405 may be a UE (e.g., the UE 120 and/or another UE described herein), and the second node 410 may be a base station (e.g., the base station 110 and/or another base station described herein). In some aspects, the first node 405 may be a first base station (e.g., the base station 110 and/or another base station described herein), and the second node 410 may be a second base station (e.g., the base station 110 and/or another base station described herein). For example, the second base station may be a backhaul base station that acts as an intermediary between the first base station (e.g., an access base station) and a core network (e.g., that includes the network controller 130). In some aspects, the first node 405 may be a first UE 120, and the second node 410 may be a second UE 120.

As shown by reference number 415, the first node 405 may determine that the first node 405 is subject to an MPE condition. For example, the first node 405 may be capable of detecting (e.g., using wideband and/or narrowband ranging techniques) whether a particular antenna subarray of the first node 405 is near and/or obstructed by a human body, whether a particular directional beam of the first node 405 is directed toward and/or obstructed by the human body, and/or the like. When subject to the MPE condition, the first node 405 may be subject to a transmission limitation due to the MPE condition (e.g., a limit on an antenna gain, a limit on a transmit power, and/or the like).

As shown by reference number 420, the first node 405 may determine an uplink beam as a candidate for communicating with the second node 410 (e.g., a beam via which the first node 405 is to transmit communications to the second node 410). In some aspects, the first node 405 may determine the uplink beam based at least in part on a determination that the first node 405 is subject to the MPE condition (e.g., is subject to a transmission limitation due to the MPE condition). For example, the first node 405 may not be permitted to use a particular uplink beam associated with the best beam parameter(s) (e.g., a signal quality parameter, a signal power parameter, and/or the like), may not be permitted to use a particular uplink beam that is part of a reciprocal beam pair with a downlink beam associated with the best beam parameter(s), and/or the like, because of the MPE condition (e.g., because the particular uplink beam is directed toward a human body). In this case, as an example, the first node 405 may determine a best uplink beam not subject to the MPE condition (e.g., an uplink beam associated with the best beam parameter(s) among a group of uplink beams not subject to the MPE condition). In some aspects, the first node 405 may determine multiple uplink beams as candidates (e.g., a group of uplink beams not subject to the MPE condition), and may rank the uplink beams based at least in part on corresponding beam parameters.

As further shown, in some aspects, the first node 405 may determine a downlink beam as a candidate for communicating with the second node 410 (e.g., a beam via which the first node 405 is to receive communications from the second node 410). In some aspects, the uplink beam and the downlink beam, identified as candidates for communicating with the second node 410, may not be part of the same reciprocal beam pair. In some aspects, the first node 405 may determine multiple downlink beams as candidates (e.g., a group of downlink beams), and may rank the downlink beams based at least in part on corresponding beam parameters.

As shown by reference number 425, the first node 405 may transmit an indication to the second node 410. In some aspects, the first node 405 may indicate that the first node 405 is subject to an MPE condition. Additionally, or alternatively, the first node 405 may indicate the uplink beam or a group of uplink beams to the second node (e.g., using a beam index or beam indices). Additionally, or alternatively, the first node 405 may indicate the downlink beam or a group of downlink beams to the second node 410 (e.g., using a beam index or beam indices). Additionally, or alternatively, the first node 405 may indicate a first reference signal associated with a first beam that is quasi co-located with the uplink beam and/or may indicate a second reference signal associated with a second beam that is quasi co-located with the downlink beam, as described in more detail below.

As an example, and as shown, a first downlink beam (e.g., shown as DL Beam 1) and a first uplink beam (e.g., shown as UL Beam 1) may be part of a first reciprocal beam pair, and a second downlink beam (e.g., shown as DL Beam 2) and a second uplink beam (e.g., shown as UL Beam 2) may be part of a second reciprocal beam pair. The first reciprocal beam pair may be associated with better beam parameters than the second reciprocal beam pair, but the first node 405 may not be permitted to use the first uplink beam due to an MPE condition. In this case, the first node 405 may determine the second uplink beam as a candidate for communicating with the second node 410.

As shown by reference number 430, the first node 405 may transmit an indication of one or more uplink beams determined as candidates for communicating with the second node 410 (e.g., one or more uplink beams that are not subject to an MPE limitation). For example, the first node 405 may transmit a beam index for UL Beam 2 and a beam index for UL Beam 3, which may be the best available uplink beams not subject to an MPE limitation. Additionally, or alternatively, the first node 405 may transmit an indication of a reference signal associated with a quasi co-located beam that is quasi co-located with the uplink beam, and the reference signal may have previously been communicated via the quasi co-located beam. When two beams are quasi co-located, one or more properties of one of the beams can be used to infer the corresponding one or more properties of the other beam, such as a delay spread, a Doppler spread, a frequency shift, an average gain, an average delay, an average received power, a received timing, and/or the like.

As shown by reference number 435, in some aspects, the reference signal may be a downlink reference signal, such as a secondary synchronization signal (SSS), a demodulation reference signal (DMRS) associated with one or more of a physical broadcast channel (PBCH), a physical downlink control channel (PDCCH), or a physical downlink shared channel (PDSCH), a channel state information reference signal (CSI-RS), a tracking reference signal (TRS), a phase tracking reference signal (PT-RS), a synchronization signal block (SS block or SSB), and/or the like. In example 400, UL Beam 2 is quasi co-located with a beam that was previously used to transmit a CSI-RS with an index of 4. In this case, the second node 410 may have previously used a particular beam to transmit CSI-RS 4, and one or more properties of that particular beam may be used by the second node 410 to infer a corresponding one or more properties of UL Beam 2. In some aspects, the first node 405 may indicate the one or more properties that are to be inferred from the quasi co-located beam used to communicate CSI-RS 4.

As shown by reference number 440, in some aspects, the reference signal may be an uplink reference signal, such as a sounding reference signal (SRS), an uplink DMRS associated with one or more of a physical uplink control channel (PUCCH) or a physical uplink shared channel (PUSCH), and/or the like. In example 400, UL Beam 3 is quasi co-located with a beam that was previously used to transmit an SRS with an index of 0. In some aspects, the first node 405 may have previously used a particular beam to transmit SRS 0, and one or more properties of that particular beam may be used by the second node 410 to infer a corresponding one or more properties of UL Beam 3. In some aspects, the first node 405 may indicate the one or more properties that are to be inferred from the quasi co-located beam used to communicate SRS 0.

In some aspects, the first node 405 may be configured (e.g., based on an instruction received from the second node 410) to transmit multiple uplink reference signals (e.g., multiple SRS and/or the like) to the second node 410 on multiple corresponding beams, and the second node 410 may determine an uplink beam to be used based at least in part on the multiple uplink reference signals transmitted by the first node 405. In some aspects, the first node 405 may transmit the multiple uplink reference signals rather than indicating one or more uplink beams as candidates for communication (e.g., rather than indicating UL Beam 3 and/or SRS 0 in example 400). In some aspects, the second node 410 may determine an uplink beam (e.g., the uplink beam via which the uplink reference signal with the best signal parameter(s) is received), and may signal the uplink beam to the first node 405 (e.g., using a signaling state table, as described in more detail elsewhere herein). Additionally, or alternatively, the second node 410 may signal one or more properties to be inferred from a beam that is quasi co-located with the uplink beam (e.g., using a signaling state table, as described in more detail elsewhere herein). In some aspects, the first node 405 may not transmit an uplink reference signal via uplink beam(s) that are subject to an MPE condition, thereby ensuring that an uplink beam subject to an MPE condition is not selected by the second node 410.

In some aspects, the first node 405 may indicate, to the second node 410, that the first node 405 is not in a beam reciprocity condition and/or that the first node 405 is subject to an MPE condition. The second node 410 may instruct the first node 405 to transmit the multiple uplink reference signals based at least in part on receiving the indication that the first node 405 is not in a beam reciprocity condition and/or that the first node 405 is subject to an MPE condition. In some aspects, the second node 410 may determine an uplink beam and/or one or more first properties of a first quasi co-located beam to be used to configure the uplink beam, and the first node 405 may determine a downlink beam and/or one or more second properties of a second quasi co-located beam to be used to configure the downlink beam.

In some aspects, the first node 405 may use a downlink reference signal to indicate the quasi co-located beam when the first node 405 is in a beam reciprocity condition. For example, when channel conditions of a reciprocal beam pair are substantially the same (e.g., within a threshold), then a downlink reference signal may be used to identify a downlink beam that is quasi co-located with an uplink beam indicated to the second node 410 because the downlink beam may have similar channel conditions as a corresponding uplink beam that is quasi co-located with the uplink beam indicated to the second node 410. Conversely, the first node 405 may use an uplink reference signal to indicate the quasi co-located beam when the first node 405 is not in a beam reciprocity condition. For example, when channel conditions of a reciprocal beam pair are not substantially the same (e.g., within a threshold), then a downlink reference signal may not have similar channel conditions as a corresponding uplink beam that is quasi co-located with the uplink beam indicated to the second node 410. In this case, the first node 405 may use an uplink reference signal to identify an uplink beam that is quasi co-located with an uplink beam indicated to the second node 410.

As shown by reference number 445, the first node 405 may transmit an indication of one or more downlink beams determined as candidates for communicating with the second node 410 (e.g., which may not be subject to an MPE limitation). For example, the first node 405 may transmit a beam index for DL Beam 1 and a beam index for DL Beam 2, which may be the best available downlink beams. Additionally, or alternatively, the first node 405 may transmit an indication of a reference signal associated with a quasi co-located beam that is quasi co-located with the downlink beam, and the reference signal may have previously been communicated via the quasi co-located beam. In some aspects, the first node 405 may indicate first quasi co-located beam associated with the uplink beam and a second (e.g., different) quasi co-located beam associated with the downlink beam.

As shown by reference number 450, in some aspects, the reference signal, associated with the quasi co-located beam that is quasi co-located with the downlink beam, may be a downlink reference signal. In example 400, DL Beam 1 is quasi co-located with a beam that was previously used to transmit a CSI-RS with an index of 3. In this case, the second node 410 may have previously used a particular beam to transmit CSI-RS 3, and one or more properties of that particular beam may be used by the second node 410 to infer a corresponding one or more properties of DL Beam 1. In some aspects, the first node 405 may indicate the one or more properties that are to be inferred from the quasi co-located beam used to communicate CSI-RS 3.

As shown by reference number 455, in some aspects, the second node 410 may configure an uplink beam based at least in part on a first quasi co-located beam that is quasi co-located with the uplink beam. For example, the second node 410 may infer one or more properties of the uplink beam based at least in part on the corresponding one or more properties of the first quasi co-located beam. Additionally, or alternatively, the second node 410 may configure a downlink beam based at least in part on a second quasi co-located beam that is quasi co-located with the downlink beam. For example, the second node 410 may infer one or more properties of the downlink beam based at least in part on the corresponding one or more properties of the second quasi co-located beam. In this way, network resources and/or processing resources may be conserved that would otherwise be consumed to determine properties of the uplink beam and/or the downlink beam. In some aspects, after configuring the uplink beam and/or the downlink beam, the second node 410 may communicate with the first node 405 using the uplink beam and/or the downlink beam.

As indicated above, FIG. 4 is provided as an example. Other examples are possible and may differ from what was described in connection with FIG. 4.

Figure 5:
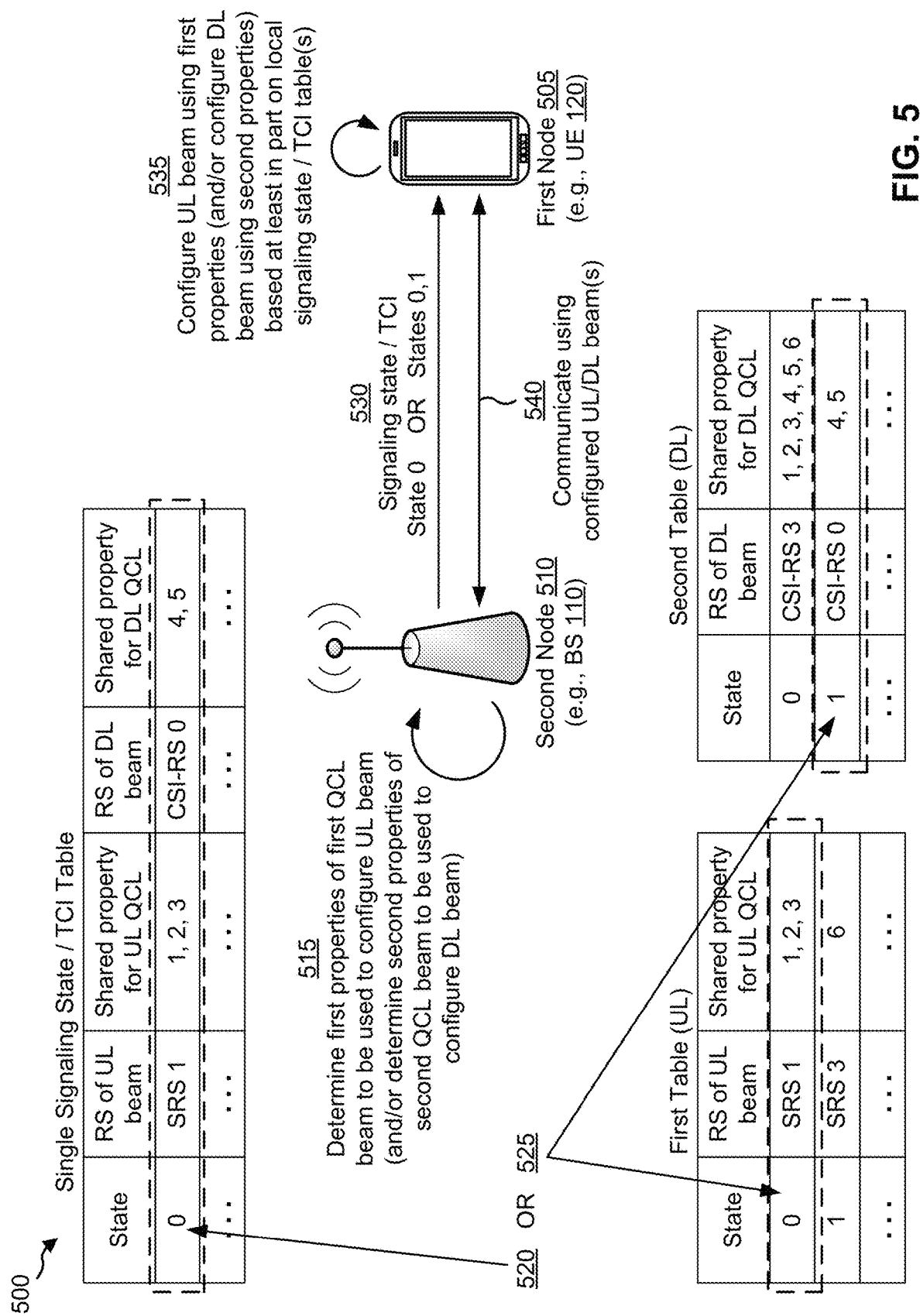

FIG. 5 is a diagram illustrating an example 500 relating to beam management to overcome maximum permissible exposure conditions.

As shown in FIG. 5, a first node 505 may communicate with a second node 510. In some aspects, the first node 505 may correspond to the first node 405, described above in connection with FIG. 4. Additionally, or alternatively, the second node 510 may correspond to the second node 510, described above in connection with FIG. 4. In some aspects, the first node 505 may be a UE (e.g., the UE 120 and/or another UE described herein), and the second node 510 may be a base station (e.g., the base station 110 and/or another base station described herein). In some aspects, the first node 505 may be a first base station (e.g., the base station 110 and/or another base station described herein), and the second node 510 may be a second base station (e.g., the base station 110 and/or another base station described herein). For example, the second base station may be a backhaul base station that acts as an intermediary between the first base station (e.g., an access base station) and a core network (e.g., that includes the network controller 130). In some aspects, the first node 505 may be a first UE 120, and the second node 510 may be a second UE 120.

As shown by reference number 515, the second node 510 may determine one or more first properties of a first quasi co-located beam to be used to configure an uplink beam (e.g., an uplink beam used to communicate information from the first node 505 to the second node 510). Additionally, or alternatively, the second node 510 may determine one or more second properties of a second quasi co-located beam to be used to configure a downlink beam (e.g., a downlink beam used to communicate information from the second node 510 to the first node 505). The one or more first properties and/or the one or more second properties may include a property that may be inferred for the uplink beam and/or the downlink beam from a property of the first quasi co-located beam and/or the second quasi co-located beam. For example, a property of the uplink beam may be the same as a property of the first quasi co-located beam, and a property of the downlink beam may be the same as a property of the second quasi co-located beam. The property may include, for example, a delay spread, a Doppler spread, a frequency shift, an average gain, an average delay, an average received power, a received timing, and/or the like.

As further shown, the second node 510 may determine a signaling state to be used to indicate the one or more first properties and/or the one or more second properties to the first node 505. In some aspects, the signaling state may be a transmission configuration indication (TCI). For example, the second node 510 may store one or more signaling state tables (e.g., one or more TCI tables) that map signaling states to the one or more first properties and/or the one or more second properties. In some aspects, a single signaling state value (e.g., stored in a single signaling state table) may be used to indicate the one or more first properties for the uplink beam and the one or more second properties for the downlink beam, as described in more detail below. In some aspects, separate signaling state values (e.g., stored in separate signaling state tables) may be used to indicate the one or more first properties and the one or more second properties, as described in more detail below.

As shown by reference number 520, in some aspects, the second node 510 may identify the signaling state using a single table, stored by the second node 510, that maps signaling state values to properties of quasi co-located beams corresponding to the uplink beam and the downlink beam. In this case, the signaling state may include a single value (e.g., a two bit value, a three bit value, and/or the like) that indicates the uplink beam, the one or more first properties of the first QCL beam, the downlink beam, and the one or more second properties of the second QCL beam.

For example, as shown, a signaling state of State 0 (e.g., bit values of 00, bit values of 000, and/or the like) indicates the uplink beam by indicating that a reference signal of SRS 1 was previously communicated via the uplink beam, indicates one or more first properties to be used to configure the uplink beam as properties 1, 2, and 3 (e.g., where each property value maps to a property to be inferred for the uplink beam), indicates the downlink beam by indicating that a reference signal of CSI-RS 0 was previously communicated via the downlink beam, and indicates one or more second properties to be used to configure the downlink beam as properties 4 and 5. In this case, upon receiving the indication of State 0, the first node 505 may configure the uplink beam using properties 1, 2, and 3 of the beam previously used to communicate SRS 1, and may configure the downlink beam using properties 4 and 5 of the beam previously used to communicate CSI-RS 0. By using a single signaling state value to communicate information for the uplink beam and the downlink beam, the second node 510 may conserve memory resources (e.g., by storing only a single table), may conserve network resources (e.g., by transmitting only a single value), and/or the like.

As shown by reference number 525, in some aspects, the second node 510 may identify the signaling state using a first table and a second table stored by the second node 510. As shown, the first table may map first signaling state values to properties of quasi co-located beams corresponding to the uplink beam, and the second table may map second signaling state values to properties of quasi co-located beams corresponding to the downlink beam. In this case, the signaling state may include a first value (e.g., a two bit value, a three bit value, and/or the like) that indicates the uplink beam and the one or more first properties of the first QCL beam, and may include a second value (e.g., a two bit value, a three bit value, and/or the like) that indicates the downlink beam and the one or more second properties of the second QCL beam.

For example, as shown, a first signaling state for the uplink beam, shown as State 0 (e.g., bit values of 00, bit values of 000, and/or the like), indicates the uplink beam by indicating that a reference signal of SRS 1 was previously communicated via the uplink beam and indicates one or more first properties to be used to configure the uplink beam as properties 1, 2, and 3. As further shown, a second signaling state for the downlink beam, shown as State 1 (e.g., bit values of 00, bit values of 000, and/or the like), indicates the downlink beam by indicating that a reference signal of CSI-RS 0 was previously communicated via the downlink beam, and indicates one or more second properties to be used to configure the downlink beam as properties 4 and 5. In this case, upon receiving the indication of State 0 for the uplink beam, the first node 505 may configure the uplink beam using properties 1, 2, and 3 of the beam previously used to communicate SRS 1, and upon receiving the indication of State 1 for the downlink beam, may configure the downlink beam using properties 4 and 5 of the beam previously used to communicate CSI-RS 0. By using separate signaling state values to communicate information for the uplink beam and the downlink beam, the second node 510 may improve flexibility by being able to indicate a greater number of combinations of properties for the uplink beam and the downlink beam.

As shown by reference number 530, the second node 510 may transmit, to the first node 505, a signaling state that indicates the uplink beam and the one or more first properties of a first quasi co-located beam to be used to configure the uplink beam. Additionally, or alternatively, the second node 510 may transmit, to the first node 505, a signaling state that indicates the downlink beam and the one or more second properties of a second quasi co-located beam to be used to configure the downlink beam. For example, as described above, the second node 510 may transmit a signaling state value that indicates properties for only the uplink beam, may transmit a signaling state value that indicates properties for only the downlink beam, and/or may transmit a signaling state value that indicates properties for both the uplink beam and the downlink beam. In some aspects, the signaling state may be transmitted in downlink control information (DCI).

As shown by reference number 535, the first node 505 may receive the signaling state value, and may configure the uplink beam and/or the downlink beam based at least in part on the signaling state value. In some aspects, the first node 505 may store one or more local signaling state tables (e.g., one or more local TCI tables) corresponding to the one or more signaling state tables stored by the second node 510. For example, if the second node 510 stores a single signaling state table for both the uplink beam and the downlink beam, then the first node 505 may store a single signaling state table for both the uplink beam and the downlink beam. Similarly, if the second node 510 stores separate signaling state tables for the uplink beam and the downlink beam, then the first node 505 may store separate signaling state tables for both the uplink beam and the downlink beam. The first node 505 may look up the signaling state value(s) in the local signaling state table(s) to identify the uplink beam, the one or more first properties for the uplink beam, the downlink beam, and/or the one or more second properties for the downlink beam. The first node 505 may use the identified information to configure the uplink beam (e.g., using the one or more first properties) and/or the downlink beam (e.g., using the one or more second properties).

In some aspects, the first node 505 may transmit one or more uplink reference signals (e.g., an SRS and/or the like) to the second node 510 via one or more corresponding uplink beams, and the second node 510 may determine an uplink beam for the first node 505 based at least in part on the one or more uplink reference signals. For example, the second node 510 may select an uplink beam with the best beam parameters based at least in part on a received uplink reference signal with the best signal parameter(s). In this case, the second node 510 may generate the signaling state table(s) for the uplink beam, and may transmit the signaling state table(s) to the first node 505. In this way, the first node 505 and the second node 510 may use the same table.

In some aspects, the signaling state may indicate one or more first properties associated with an uplink receive beam at the second node 510 (e.g., a beam used to receive information by the second node 510), which may be used by the first node 505 to configure an uplink transmit beam at the first node 505 (e.g., a beam used to transmit information by the first node 505). Additionally, or alternatively, the signaling state may indicate one or more second properties associated with a downlink transmit beam at the second node 510 (e.g., a beam used to transmit information by the second node 510), which may be used by the first node 505 to configure a downlink receive beam at the first node 505 (e.g., a beam used to receive information by the first node 505). For example, the second node 510 may signal the quasi co-location relationship from the perspective of the second node 510, and the first node 505 may use that relationship to configure beams from the perspective of the first node 505.

As shown by reference number 540, the first node 505 and the second node 510 may communicate using the configured uplink beam and/or the configured downlink beam. By communicating configuration information for the uplink beam and the downlink beam (e.g., rather than communicating configuration information for only one beam of a reciprocal beam pair), the first node 505 and the second node 510 may be capable of configuring non-reciprocal beams and communicating using the non-reciprocal beams. This may improve performance and comply with government regulations when, for example, the first node 505 is subject to an MPE condition.

As indicated above, FIG. 5 is provided as an example. Other examples are possible and may differ from what was described in connection with FIG. 5.

Figure 6:
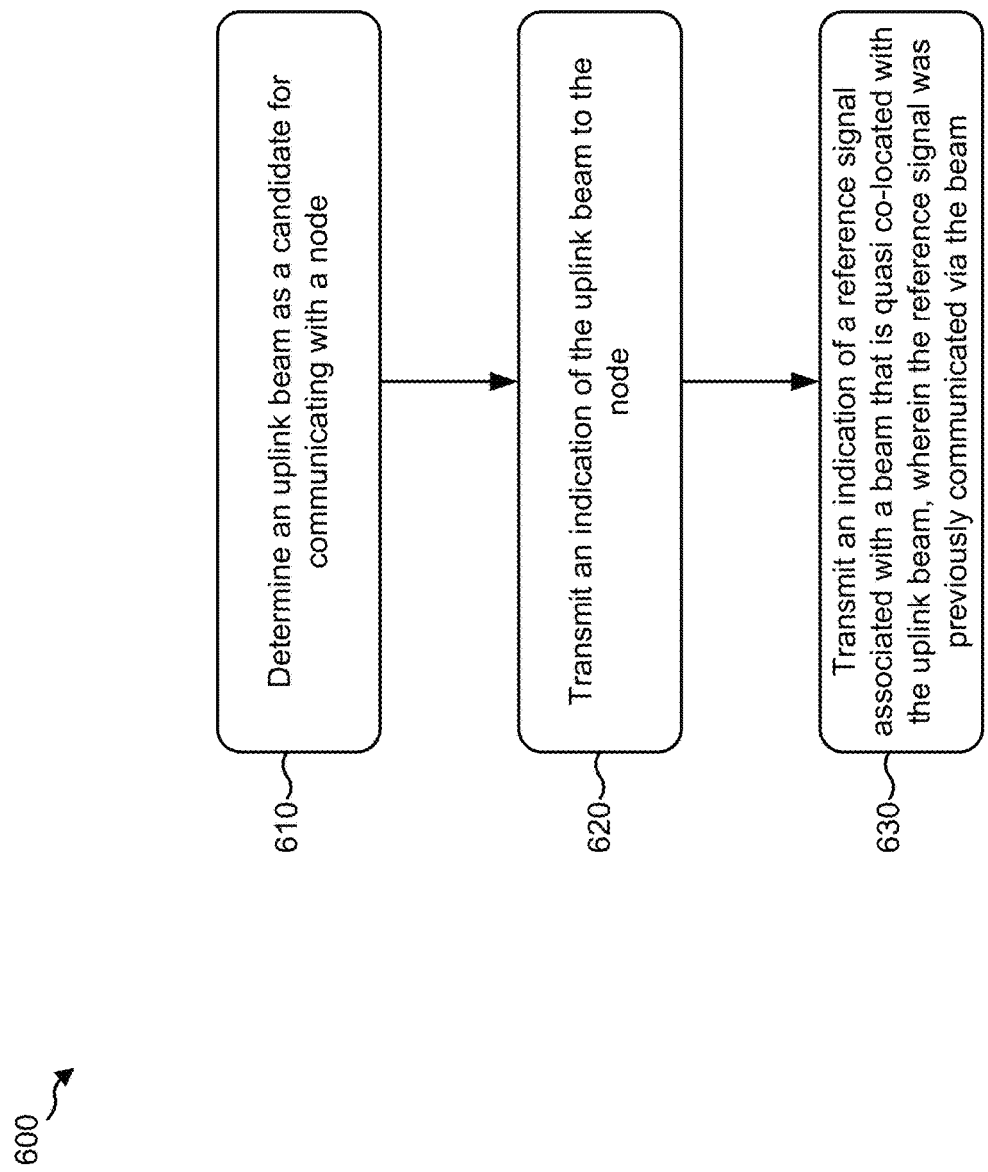
FIGS. 6-11 are flow charts of example methods of wireless communication.

FIG. 6 is a flow chart of a method 600 of wireless communication. The method may be performed by a node (e.g., the first node 405 of FIG. 4, the first node 505 of FIG. 5, the UE 120 of FIG. 1, the base station 110 of FIG. 1, the apparatus 1202/1202' of FIGS. 12 and/or 13, and/or the like).

At 610, the node may determine an uplink beam as a candidate for communicating with another node. For example, a first node may determine an uplink beam as a candidate for communicating with a second node, as described above in connection with FIG. 4. In some aspects, the uplink beam is determined based at least in part on a determination that the first node is subject to a transmission limitation due to a maximum permissible exposure condition. Additionally, or alternatively, the uplink beam may be determined by measuring one or more uplink beams (e.g., using one or more reference signals) and determining the best uplink beam that is not subject to a maximum permissible exposure condition.

At 620, the node may transmit an indication of the uplink beam to the other node. For example, the first node may transmit an indication of the uplink beam to the second node, as described above in connection with FIG. 4. In some aspects, the first node is configured to determine a downlink beam as a candidate for communicating with the second node and transmit an indication of the downlink beam to the second node. In some aspects, the uplink beam and the downlink beam are not a reciprocal beam pair.

At 630, the node may transmit an indication of a reference signal associated with a beam that is quasi co-located with the uplink beam, wherein the reference signal was previously communicated via the beam. For example, the first node may transmit an indication of a reference signal associated with a beam that is quasi co-located with the uplink beam, as described above in connection with FIG. 4. In some aspects, the reference signal may have been previously communicated via the beam.

In some aspects, the reference signal is a downlink reference signal. In some aspects, the downlink reference signal is indicated based at least in part on a determination that the first node is in a beam reciprocity condition. In some aspects, the downlink reference signal is at least one of: a secondary synchronization signal, a demodulation reference signal associated with one or more of a physical broadcast channel (PBCH), a physical downlink control channel (PDCCH), or a physical downlink shared channel (PDSCH), a channel state information reference signal, a tracking reference signal, a phase tracking reference signal, a synchronization signal block, or a combination thereof.

In some aspects, the reference signal is an uplink reference signal. In some aspects, the uplink reference signal is indicated based at least in part on a determination that the first node is not in a beam reciprocity condition. In some aspects, the uplink reference signal is at least one of: a sounding reference signal, an uplink demodulation reference signal associated with one or more of a physical uplink control channel (PUCCH) or a physical uplink shared channel (PUSCH), or a combination thereof.

In some aspects, the first node is a user equipment and the second node is a base station. In some aspects, the first node is a first base station and the second node is a second base station. In some aspects, the first node indicates the maximum permissible exposure condition to the second node. In some aspects, the first node is configured to indicate a first quasi co-located beam associated with the uplink beam and a second quasi co-located beam associated with a downlink beam. In some aspects, one or more properties of the beam that is quasi co-located with the uplink beam are used to configure the uplink beam.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
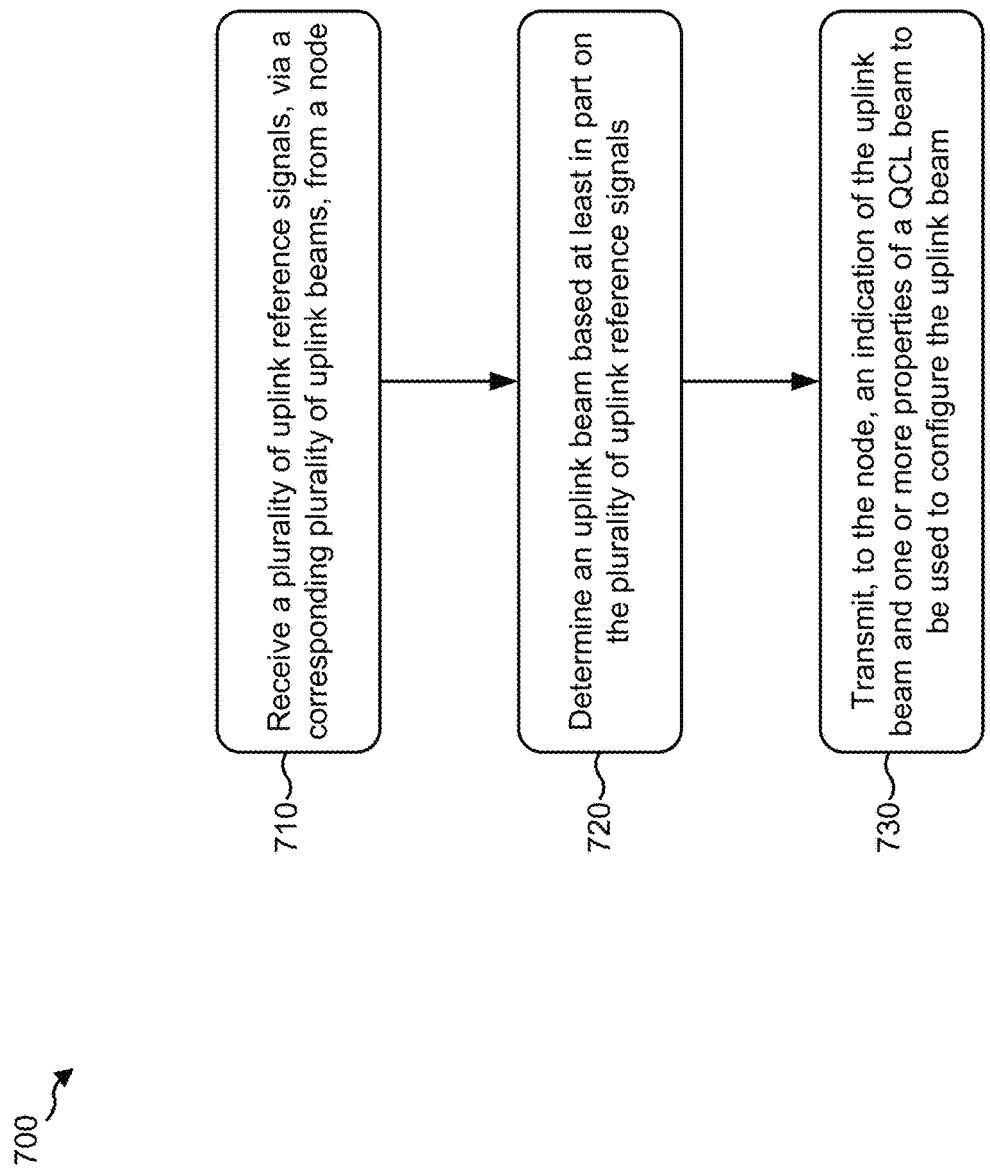

FIG. 7 is a flow chart of a method 700 of wireless communication. The method may be performed by a node (e.g., the first node 405 of FIG. 4, the first node 505 of FIG. 5, the UE 120 of FIG. 1, the base station 110 of FIG. 1, the apparatus 1202/1202' of FIGS. 12 and/or 13, and/or the like).

At 710, the node may receive a plurality of uplink reference signals, via a corresponding plurality of uplink beams, from another node. For example, a second node may receive a plurality of uplink reference signals, via a corresponding plurality of uplink beams, from a first node, as described above in connection with FIGS. 4 and 5. In some aspects, the second node instructs the first node to transmit the plurality of uplink reference signals to the second node. In some aspects, the plurality of uplink beams are not subject to a maximum permissible exposure condition at the first node. In some aspects, the plurality of uplink reference signals are received based at least in part on a determination that the first node is not in a beam reciprocity condition or that the first node is subject to a maximum permissible exposure condition. In some aspects, an uplink reference signal is at least one of: a sounding reference signal, an uplink demodulation reference signal associated with one or more of a physical uplink control channel (PUCCH) or a physical uplink shared channel (PUSCH), or a combination thereof.

At 720, the node may determine an uplink beam, of the plurality of uplink beams, based at least in part on the plurality of uplink reference signals. For example, the second node may select an uplink beam, of the plurality of uplink beams, based at least in part on the plurality of uplink reference signals, as described above in connection with FIGS. 4 and 5. In some aspects, the uplink beam is determined and/or selected based at least in part on measuring the plurality of uplink reference signals to determine an uplink beam that corresponds to the best uplink reference signal (e.g., the uplink reference signal with the best conditions).

At 730, the node may transmit, to the other node, an indication of the uplink beam and one or more properties of a quasi co-located (QCL) beam to be used to configure the uplink beam. For example, the second node may transmit, to the first node, an indication of the uplink beam and one or more properties of a QCL beam to be used to configure the uplink beam, as described above in connection with FIGS. 4 and 5. In some aspects, the uplink beam is indicated by indicating a reference signal, of the plurality of uplink reference signals, that corresponds to the uplink beam. For example, the best reference signal, of the plurality of uplink reference signals, may be indicated.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
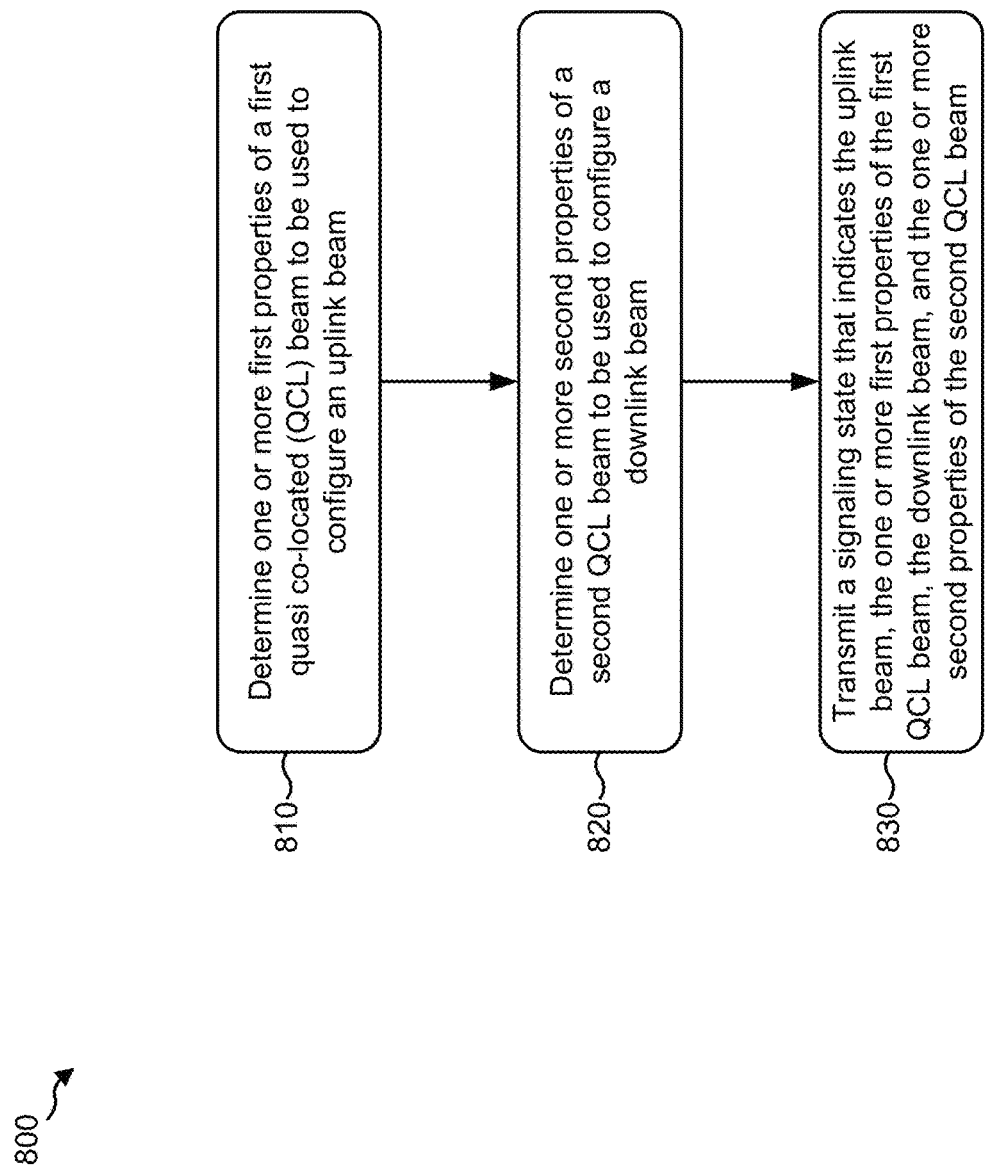

FIG. 8 is a flow chart of a method 800 of wireless communication. The method may be performed by a node (e.g., the second node 410 of FIG. 4, the second node 510 of FIG. 5, the base station 110 of FIG. 1, the UE 120 of FIG. 1, the apparatus 1202/1202' of FIGS. 12 and/or 13, and/or the like).

At 810, the node may determine one or more first properties of a first quasi co-located (QCL) beam to be used to configure an uplink beam. For example, a second node may determine one or more first properties of a first QCL beam to be used to configure an uplink beam, as described above in connection with FIG. 5. The one or more first properties may include, for example, a delay spread, a Doppler spread, a frequency shift, an average gain, an average delay, an average received power, a received timing, and/or the like. These properties may be properties of a beam that is quasi co-located with the uplink beam.

At 820, the node may determine one or more second properties of a second QCL beam to be used to configure a downlink beam. For example, the second node may determine one or more second properties of a second QCL beam to be used to configure a downlink beam, as described above in connection with FIG. 5. The one or more second properties may include, for example, a delay spread, a Doppler spread, a frequency shift, an average gain, an average delay, an average received power, a received timing, and/or the like. These properties may be properties of a beam that is quasi co-located with the downlink beam.

At 830, the node may transmit a signaling state that indicates the uplink beam, the one or more first properties of the first QCL beam, the downlink beam, and the one or more second properties of the second QCL beam. For example, the second node may transmit a signaling state, as described above in connection with FIG. 5. In some aspects, the signaling state may indicate one or more of the uplink beam, the one or more first properties of the first QCL beam, the downlink beam, and/or the one or more second properties of the second QCL beam. In some aspects, the signaling state includes a single value that indicates the uplink beam, the one or more first properties of the first QCL beam, the downlink beam, and the one or more second properties of the second QCL beam. In some aspects, the signaling state includes a first value that indicates the uplink beam and the one or more first properties of the first QCL beam, and the signaling state includes a second value that indicates the downlink beam and the one or more second properties of the second QCL beam.

In some aspects, the signaling state is identified using a single table, stored by the node, that maps signaling state values to properties of quasi co-located beams corresponding to the uplink beam and the downlink beam. In some aspects, the signaling state is identified using a first table and a second table stored by the node, wherein the first table maps first signaling state values to properties of quasi co-located beams corresponding to the uplink beam and the second table maps second signaling state values to properties of quasi co-located beams corresponding to the downlink beam.

In some aspects, the signaling state is a transmission configuration indication. In some aspects, the one or more first properties of the first QCL beam are used to configure the uplink beam and the one or more second properties of the second QCL beam are used to configure the downlink beam.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
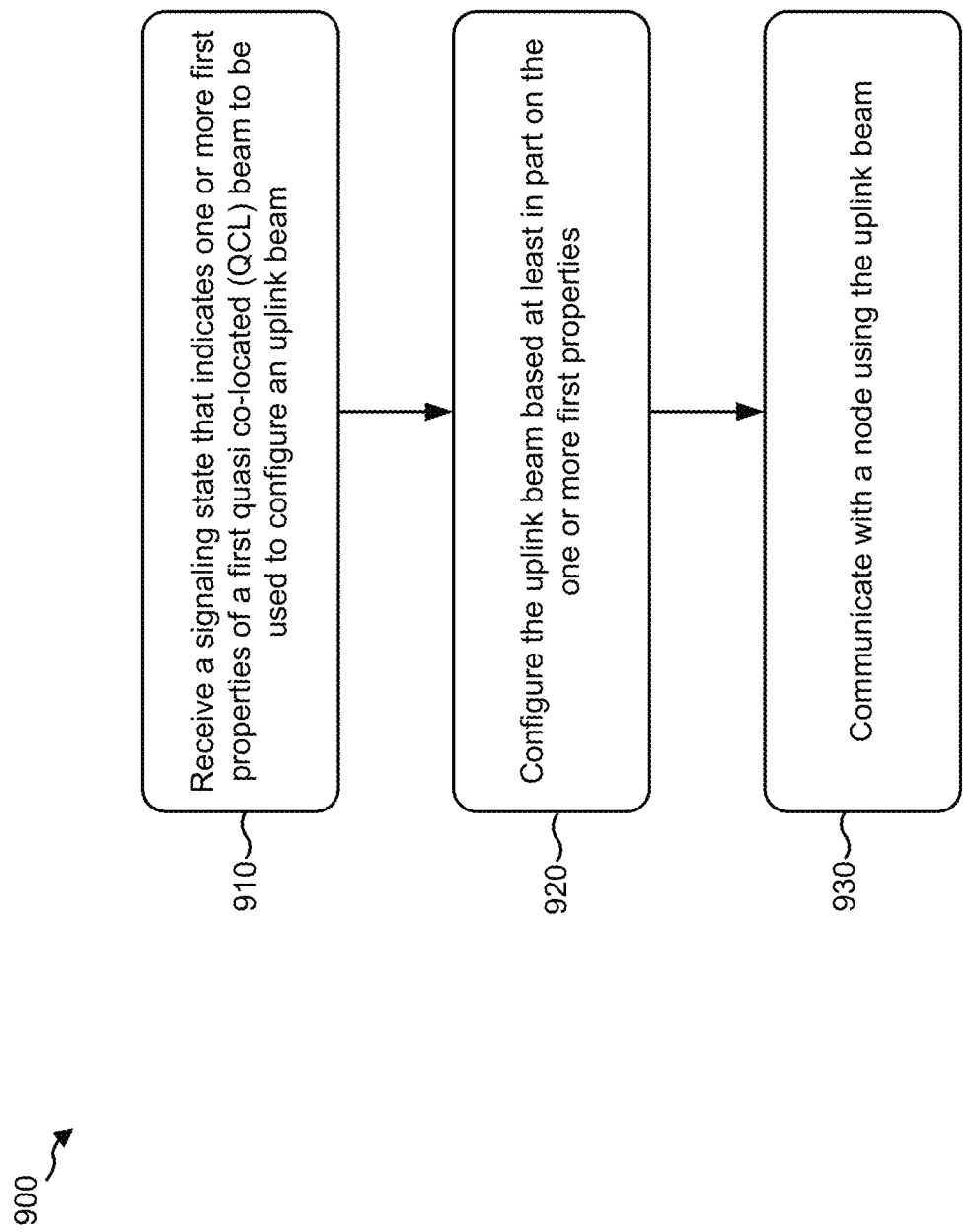

FIG. 9 is a flow chart of a method 900 of wireless communication. The method may be performed by a node (e.g., the first node 405 of FIG. 4, the first node 505 of FIG. 5, the UE 120 of FIG. 1, the base station 110 of FIG. 1, the apparatus 1202/1202' of FIGS. 12 and/or 13, and/or the like).

At 910, the node may receive a signaling state that indicates one or more first properties of a first quasi co-located (QCL) beam to be used to configure an uplink beam. For example, a first node may receive a signaling state that indicates one or more first properties of a first QCL beam, as described above in connection with FIG. 5. In some aspects, the one or more first properties are to be used to configure an uplink beam. The one or more first properties may include, for example, a delay spread, a Doppler spread, a frequency shift, an average gain, an average delay, an average received power, a received timing, and/or the like. These properties may be properties of a beam that is quasi co-located with the uplink beam. In some aspects, the signaling state is a transmission configuration indication.

In some aspects, the signaling state indicates one or more second properties of a second QCL beam to be used to configure a downlink beam. In some aspects, the first node is configured to communicate with the second node using the downlink beam configured based at least in part on the one or more second properties. In some aspects, the signaling state includes a single value that indicates both the one or more first properties of the first QCL beam and the one or more second properties of the second QCL beam. In some aspects, the signaling state includes a first value that indicates the one or more first properties of the first QCL beam and a second value that indicates the one or more second properties of the second QCL beam.

At 920, the node may configure the uplink beam based at least in part on the one or more first properties indicated in the signaling state. For example, the first node may configure the uplink beam based at least in part on the one or more first properties indicated in the signaling state, as described above in connection with FIG. 5. The uplink beam may be configured, for example, by setting one or more properties of the uplink beam to be the same as the one or more first properties indicated in the signaling state. These properties may be properties of a beam that is quasi co-located with the uplink beam, and can therefore be used to configure the uplink beam.

In some aspects, the uplink beam and the downlink beam are configured using information stored by the first node in a single table that maps signaling state values to properties of QCL beams corresponding to the uplink beam and the downlink beam. In some aspects, the uplink beam and the downlink beam are configured using information stored by the first node in a first table and a second table, wherein the first table maps first signaling state values to properties of QCL beams corresponding to the uplink beam and the second table maps second signaling state values to properties of QCL beams corresponding to the downlink beam.

At 930, the node may communicate with another node using the uplink beam. For example, the first node may communicate with a second node using the uplink beam, as described above in connection with FIG. 5. For example, the first node and the second node may exchange control information on the uplink beam. In some aspects, the control information may be transmitted via an uplink control channel, such as a physical uplink control channel (PUCCH). Additionally, or alternatively, the first node and the second node may exchange data on the uplink beam. In some aspects, the data may be transmitted via an uplink data channel, such as a physical uplink shared channel (PUSCH).

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
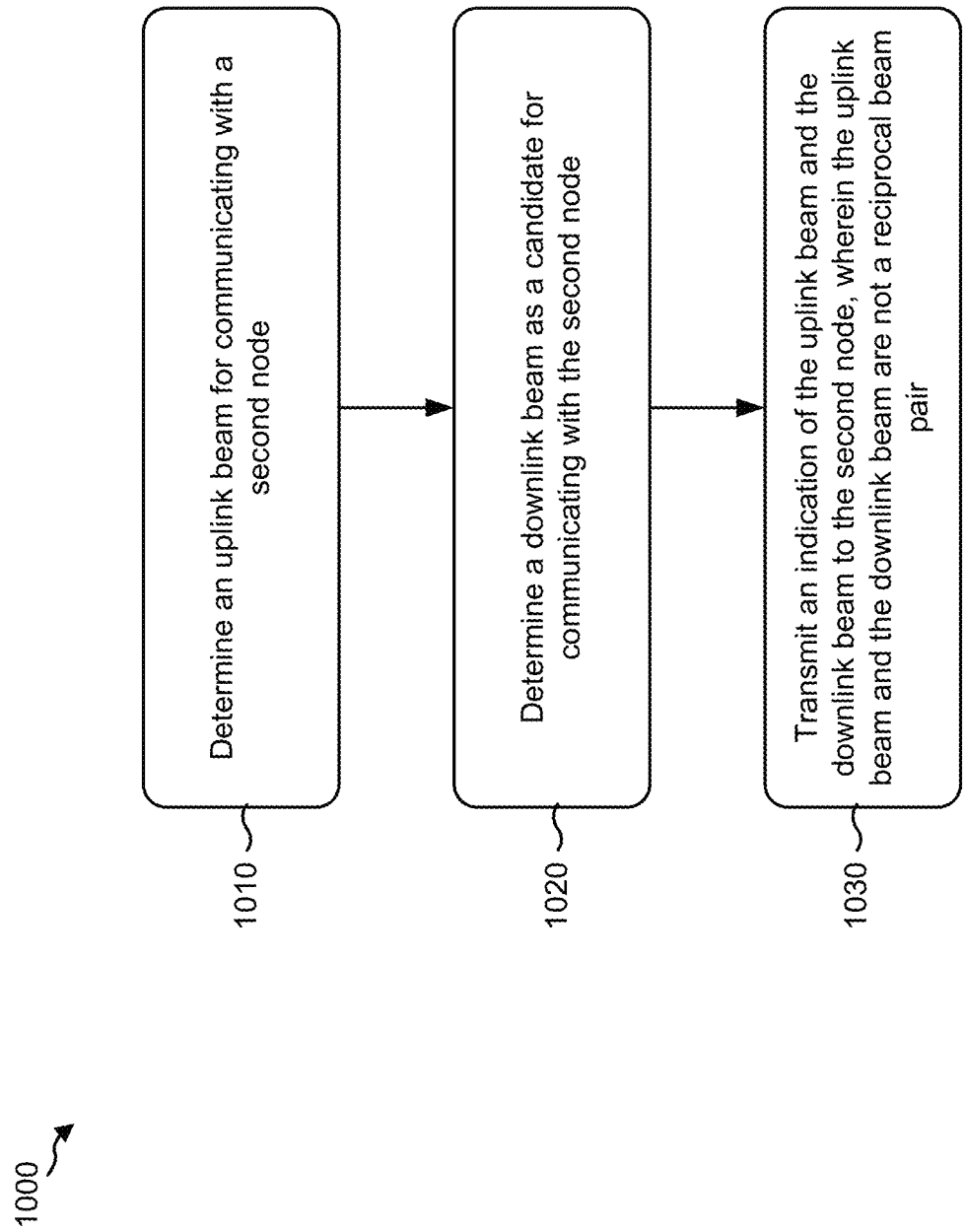

FIG. 10 is a flow chart of a method 1000 of wireless communication. The method may be performed by a node (e.g., the first node 405 of FIG. 4, the first node 505 of FIG. 5, the UE 120 of FIG. 1, the base station 110 of FIG. 1, the apparatus 1202/1202' of FIGS. 12 and/or 13, and/or the like).

At 1010, the node may determine an uplink beam for communicating with a second node. For example, a first node may determine an uplink beam for communicating with a second node, as described above in connection with FIGS. 4-5. In some aspects, the uplink beam is determined based at least in part on a determination that the first node is subject to a transmission limitation due to a maximum permissible exposure condition. In some aspects, the first node indicates the maximum permissible exposure condition to the second node.

At 1020, the node may determine a downlink beam as a candidate for communicating with the second node. For example, the first node may determine a downlink beam as a candidate for communicating with the second node, as described above in connection with FIGS. 4-5. In some aspects, the downlink beam does not form a reciprocal beam pair with the uplink beam. In some aspects, the first node is configured to indicate a first quasi co-located beam associated with the uplink beam and a second quasi co-located beam associated with a downlink beam.

At 1030, the node may transmit an indication of the uplink beam and the downlink beam to the second node, wherein the uplink beam and the downlink beam are not a reciprocal beam pair. For example, the first node may transmit an indication of the uplink beam and the downlink beam to the second node, as described above in connection with FIGS. 4-5. In some aspects, the uplink beam and the downlink beam are not a reciprocal beam pair. In some aspects, the indication of the uplink beam includes an indication of a reference signal associated with a beam that is quasi co-located with the uplink beam, wherein the reference signal was previously communicated via the beam.

In some aspects, the reference signal is a downlink reference signal. In some aspects, the downlink reference signal is indicated based at least in part on a determination that the first node is in a beam reciprocity condition. In some aspects, the downlink reference signal is at least one of: a secondary synchronization signal, a demodulation reference signal associated with one or more of a physical broadcast channel (PBCH), a physical downlink control channel (PDCCH), or a physical downlink shared channel (PDSCH), a channel state information reference signal, a tracking reference signal, a phase tracking reference signal, a synchronization signal block, or a combination thereof.

In some aspects, the reference signal is an uplink reference signal. In some aspects, the uplink reference signal is indicated based at least in part on a determination that the first node is not in a beam reciprocity condition. In some aspects, the uplink reference signal is at least one of: a sounding reference signal, an uplink demodulation reference signal associated with one or more of a physical uplink control channel (PUCCH) or a physical uplink shared channel (PUSCH), or a combination thereof.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
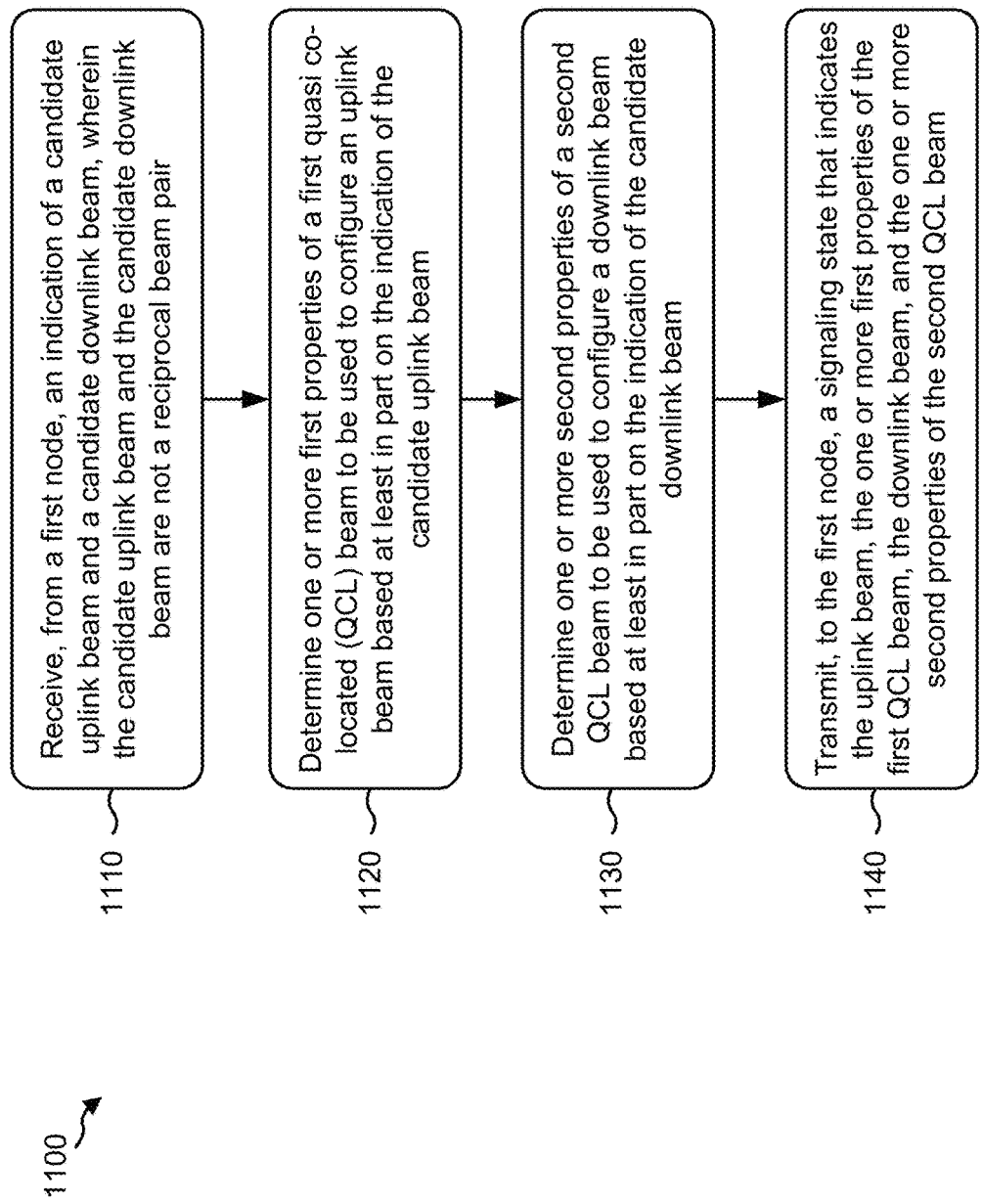

FIG. 11 is a flow chart of a method 1100 of wireless communication. The method may be performed by a node (e.g., the second node 410 of FIG. 4, the second node 510 of FIG. 5, the base station 110 of FIG. 1, the UE 120 of FIG. 1, the apparatus 1202/1202' of FIGS. 12 and/or 13, and/or the like).

At 1110, the node may receive, from a first node, an indication of a candidate uplink beam and a candidate downlink beam, wherein the candidate uplink beam and the candidate downlink beam are not a reciprocal beam pair. For example, a second node may receive, from a first node, an indication of a candidate uplink beam and a candidate downlink beam, as described above in connection with FIGS. 4-5. In some aspects, the candidate uplink beam and the candidate downlink beam are not a reciprocal beam pair. In some aspects, the second node is a base station and the first node is a UE.

At 1120, the node may determine one or more first properties of a first quasi co-located (QCL) beam to be used to configure an uplink beam based at least in part on the indication of the candidate uplink beam. For example, the second node may determine one or more first properties of a first QCL beam to be used to configure an uplink beam based at least in part on the indication of the candidate uplink beam, as described above in connection with FIGS. 4-5. In some aspects, the one or more first properties of the first QCL beam are used to configure the uplink beam. The one or more first properties may include, for example, a delay spread, a Doppler spread, a frequency shift, an average gain, an average delay, an average received power, a received timing, and/or the like. These properties may be properties of a beam that is quasi co-located with the uplink beam.

At 1130, the node may determine one or more second properties of a second QCL beam to be used to configure a downlink beam based at least in part on the indication of the candidate downlink beam. For example, the second node may determine one or more second properties of a second QCL beam to be used to configure a downlink beam based at least in part on the indication of the candidate downlink beam, as described above in connection with FIGS. 4-5. In some aspects, the one or more second properties of the second QCL beam are used to configure the downlink beam. The one or more second properties may include, for example, a delay spread, a Doppler spread, a frequency shift, an average gain, an average delay, an average received power, a received timing, and/or the like. These properties may be properties of a beam that is quasi co-located with the downlink beam.

At 1140, the node may transmit, to the first node, a signaling state that indicates the uplink beam, the one or more first properties of the first QCL beam, the downlink beam, and the one or more second properties of the second QCL beam. For example, the second node may transmit, to the first node, a signaling state that indicates the uplink beam, the one or more first properties of the first QCL beam, the downlink beam, and the one or more second properties of the second QCL beam, as described above in connection with FIGS. 4-5. In some aspects, the signaling state includes a first value that indicates the uplink beam and the one or more first properties of the first QCL beam. In some aspects, the signaling state includes a second value that indicates the downlink beam and the one or more second properties of the second QCL beam.

In some aspects, the signaling state is identified using a single table, stored by the second node, that maps signaling state values to properties of quasi co-located beams corresponding to the uplink beam and the downlink beam. In some aspects, the signaling state is identified using a first table and a second table stored by the second node, wherein the first table maps first signaling state values to properties of quasi co-located beams corresponding to the uplink beam and the second table maps second signaling state values to properties of quasi co-located beams corresponding to the downlink beam. In some aspects, the signaling state is a transmission configuration indication.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
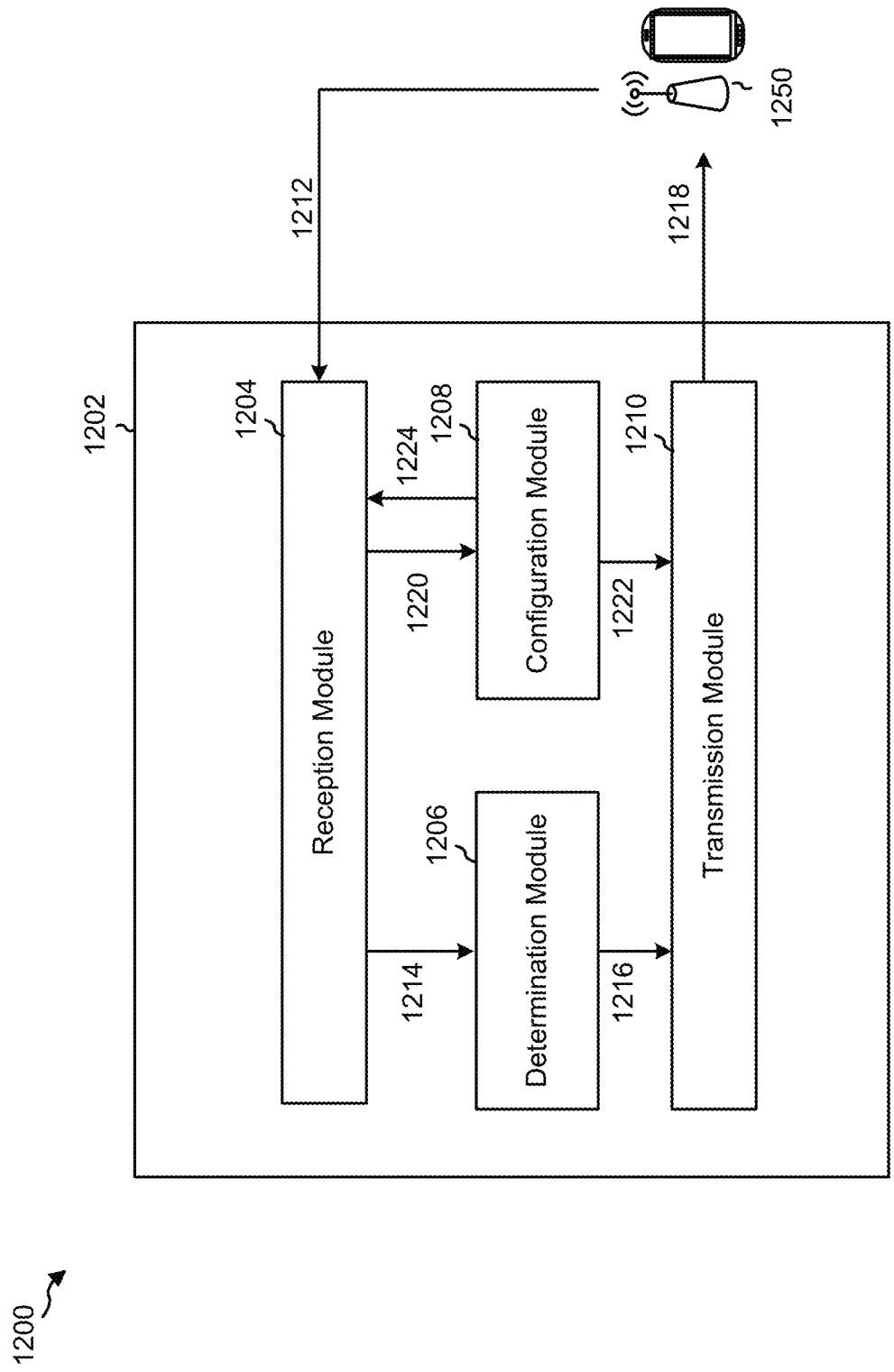
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a node (e.g., the first node 405 of FIG. 4, the second node 410 of FIG. 4, the first node 505 of FIG. 5, the second node 510 of FIG. 5, the base station 110, the UE 120, and/or the like). In some aspects, the apparatus 1202 includes a reception module 1204, a determination module 1206, a configuration module 1208, and/or a transmission module 1210.

In some aspects, the reception module 1204 may receive, as data 1212, information associated with one or more beams (e.g., beam parameters associated with an uplink beam and/or a downlink beam). The determination module 1206 may receive such information from the reception module 1204 as data 1214, and/or may determine whether the apparatus 1202 is subject to an MPE condition. The determination module 1206 may determine an uplink beam as a candidate for communicating with another apparatus 1250 (e.g., the first node 405 of FIG. 4, the second node 410 of FIG. 4, the first node 505 of FIG. 5, the second node 510 of FIG. 5, the base station 110, the UE 120, and/or the like). The transmission module 1210 may receive information associated with the uplink beam from the determination module 1206 as data 1216. The transmission module 1210 may transmit, as data 1218, an indication of the uplink beam to the apparatus 1250. Additionally, or alternatively, the transmission module 1210 may transmit, as data 1218, an indication of a reference signal associated with a beam that is quasi-located with the uplink beam, wherein the reference signal was previously communicated via the beam.

Additionally, or alternatively, the reception module 1204 may receive, as data 1212, a plurality of uplink reference signals, via a corresponding plurality of beams, from another apparatus 1250. The determination module 1206 may receive information associated with the uplink reference signals from the reception module 1204 as data 1214, and may determine an uplink beam based at least in part on the data 1214. The transmission module 1210 may receive information associated with the uplink beam from the determination module 1206 as data 1216. The transmission module 1210 may transmit, as data 1218, an indication of the uplink beam to the apparatus 1250. Additionally, or alternatively, the transmission module 1210 may transmit, as data 1218, an indication of one or more properties of a QCL beam to be used to configure the uplink beam.

Additionally, or alternatively, the reception module 1204 may receive, as data 1212, information associated with an uplink beam, a first QCL beam corresponding to the uplink beam, a downlink beam, and/or a second QCL beam corresponding to the downlink beam (e.g., one or more beam parameters associated with these beams). The determination module 1206 may receive such information from the reception module 1204 as data 1214, and may determine one or more first properties of the first QCL beam to be used to configure the uplink beam. Additionally, or alternatively, the determination module 1206 may determine one or more second properties of the second QCL beam to be used to configure the downlink beam. The transmission module 1210 may receive, as data 1216, information associated with the uplink beam, the one or more first properties, the downlink beam, and/or the one or more second properties. The transmission module 1210 may transmit, as data 1218 to the apparatus 1250, a signaling state that indicates the uplink beam, the one or more first properties of the first QCL beam, the downlink beam, and/or the one or more second properties of the second QCL beam.

Additionally, or alternatively, the reception module 1204 may receive, as data 1212, a signaling state that indicates one or more first properties of a first QCL beam to be used to configure an uplink beam. The configuration module 1208 may receive information associated with the signaling state, the one or more first properties, the first QCL beam, and/or the uplink beam as data 1220 from the reception module 1204. The configuration module may configure the uplink beam based at least in part on the one or more first properties indicated in the signaling state, and may provide configuration information for the uplink beam to the transmission module 1210 as data 1222. Additionally, or alternatively, the configuration module may configure a downlink beam based at least in part on the signaling state, and may provide configuration indication for the downlink beam to the reception module 1204 as data 1224. The transmission module 1210 may communicate with the apparatus 1250 using the configured uplink beam, and/or the reception module 1204 may communicate with the apparatus 1250 using the configured downlink beam.

Additionally, or alternatively, the determination module 1206 may determine an uplink beam for communication with the apparatus 1250, and/or may determine a downlink beam as a candidate for communicating with the apparatus 1250. Such determinations may be based at least in part on measurements of the reception module 1204 (e.g., as data 1212), the result of which may be provided to the determination module 1206 as data 1214. The uplink beam and the downlink beam determined by the determination module 1206 may not be reciprocal beam pair. The determination module 1206 may indicate the determined uplink beam and/or the determined downlink beam to the transmission module 1210 as data 1216. The transmission module 1210 may transmit an indication of the uplink beam and the downlink beam to the apparatus 1250.

Additionally, or alternatively, the reception module 1204 may receive, from the apparatus 1250 as data 1212, an indication of a candidate uplink beam and a candidate downlink beam. In some aspects, the candidate uplink beam and the candidate downlink beam are not a reciprocal beam pair. The reception module 1204 may pass this information to the determination module 1206 as data 1214. The determination module 1206 may determine one or more first properties of a first quasi co-located (QCL) beam to be used to configure an uplink beam based at least in part on the indication of the candidate uplink beam. Additionally, or alternatively, the determination module 1206 may determine one or more second properties of a second QCL beam to be used to configure a downlink beam based at least in part on the indication of the candidate downlink beam. The determination module 1206 may indicate the one or more first properties and/or the one or more second properties to the transmission module 1210 as data 1216. The transmission module 1210 may transmit, to the apparatus 1250 as data 1218, a signaling state that indicates the uplink beam, the one or more first properties of the first QCL beam, the downlink beam, and the one or more second properties of the second QCL beam.

The apparatus may include additional modules that perform each of the blocks of the algorithm in the aforementioned flow chart of FIGS. 6, 7, 8, 9, 10, and/or 11. As such, each block in the aforementioned flow chart of FIGS. 6, 7, 8, 9, 10, and/or 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
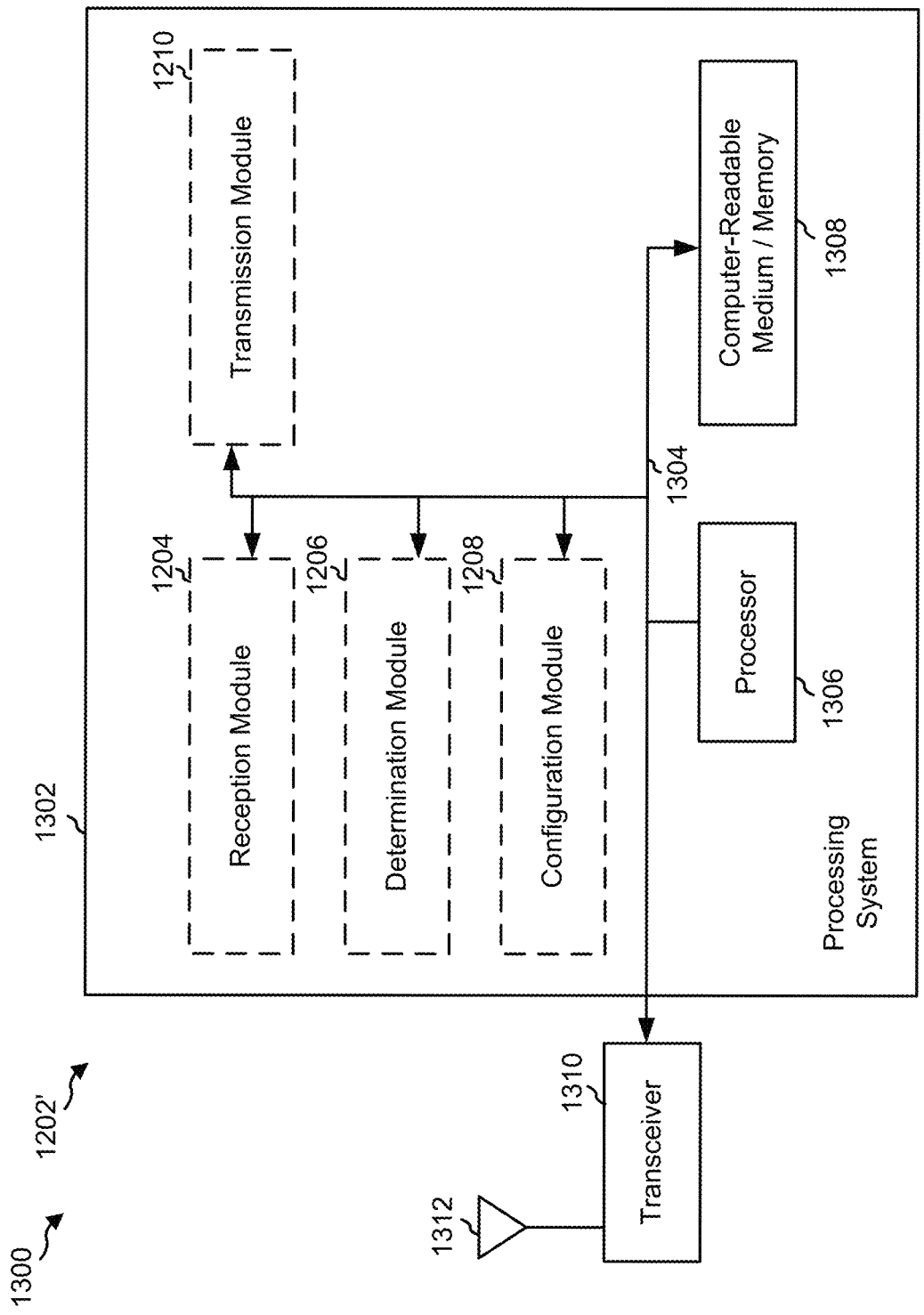
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a node (e.g., the first node 405 of FIG. 4, the second node 410 of FIG. 4, the first node 505 of FIG. 5, the second node 510 of FIG. 5, the base station 110, the UE 120, and/or the like).

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and/or 1210 and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1210, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, 1208, and/or 1210. The modules may be software modules running in the processor 1306, resident/stored in the computer readable medium/memory 1308, one or more hardware modules coupled to the processor 1306, or a combination thereof.

In some aspects, the processing system 1302 may be a component of the BS 110 and may include the memory 242 and/or at least one of the TX MIMO processor 230, the RX processor 238, and/or the controller/processor 240. In some aspects, the processing system 1302 may be a component of the UE 120 and may include the memory 282 and/or at least one of the TX MIMO processor 266, the RX processor 258, and/or the controller/processor 280.

In some aspects, the apparatus 1202/1202' for wireless communication includes means for determining an uplink beam as a candidate for communicating with a second node, means for transmitting an indication of the uplink beam to the second node, means for transmitting an indication of a reference signal associated with a beam that is quasi co-located with the uplink beam, wherein the reference signal was previously communicated via the beam, and/or the like. Additionally, or alternatively, the apparatus 1202/1202' for wireless communication may include means for determining one or more first properties of a first quasi co-located (QCL) beam to be used to configure an uplink beam, means for determining one or more second properties of a second QCL beam to be used to configure a downlink beam, means for transmitting a signaling state that indicates the uplink beam, the one or more first properties of the first QCL beam, the downlink beam, and the one or more second properties of the second QCL beam, and/or the like. Additionally, or alternatively, the apparatus 1202/1202' for wireless communication may include means for receiving a signaling state that indicates one or more first properties of a first quasi co-located (QCL) beam to be used to configure an uplink beam, means for configuring the uplink beam based at least in part on the one or more first properties indicated in the signaling state, means for communicating with a second node using the uplink beam, and/or the like. Additionally, or alternatively, the apparatus 1202/1202' for wireless communication may include means for determining an uplink beam for communicating with a second node; means for determining a downlink beam as a candidate for communicating with the second node; means for transmitting an indication of the uplink beam and the downlink beam to the second node, wherein the uplink beam and the downlink beam are not a reciprocal beam pair; and/or the like. Additionally, or alternatively, the apparatus 1202/1202' for wireless communication may include means for receiving, from a first node, an indication of a candidate uplink beam and a candidate downlink beam, wherein the candidate uplink beam and the candidate downlink beam are not a reciprocal beam pair; means for determining one or more first properties of a first quasi co-located (QCL) beam to be used to configure an uplink beam based at least in part on the indication of the candidate uplink beam; means for determining one or more second properties of a second QCL beam to be used to configure a downlink beam based at least in part on the indication of the candidate downlink beam; means for transmitting, to the first node, a signaling state that indicates the uplink beam, the one or more first properties of the first QCL beam, the downlink beam, and the one or more second properties of the second QCL beam; and/or the like.

The aforementioned means may be one or more of the aforementioned modules of the apparatus 1202 and/or the processing system 1302 of the apparatus 1202' configured to perform the functions recited by the aforementioned means. As described supra, in some aspects, the processing system 1302 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means. Additionally, or alternatively, as described supra, the processing system 1302 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 13 is provided as an example. Other examples are possible and may differ from what was described in connection with FIG. 13.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a first node, comprising:
    determining an uplink beam for communicating with a second node;
    determining a downlink beam as a candidate for communicating with the second node; and
    transmitting an indication of the uplink beam and the downlink beam to the second node, wherein the uplink beam and the downlink beam are not a reciprocal beam pair, wherein the uplink beam and the downlink beam propagate along different paths, wherein the indication of the uplink beam includes an indication of a reference signal associated with a beam that is quasi co-located with the uplink beam, and wherein the reference signal was previously communicated via the beam.

2. The method of claim 1, wherein the reference signal is a downlink reference signal.

3. The method of claim 2, wherein the downlink reference signal is indicated based at least in part on a determination that the first node is in a beam reciprocity condition.

4. The method of claim 2, wherein the downlink reference signal is at least one of:
    a secondary synchronization signal,
    a demodulation reference signal associated with one or more of a physical broadcast channel (PBCH), a physical downlink control channel (PDCCH), or a physical downlink shared channel (PDSCH),
    a channel state information reference signal,
    a tracking reference signal,
    a phase tracking reference signal,
    a synchronization signal block, or
    a combination thereof.

5. The method of claim 1, wherein the reference signal is an uplink reference signal.

6. The method of claim 5, wherein the uplink reference signal is indicated based at least in part on a determination that the first node is not in a beam reciprocity condition.

7. The method of claim 5, wherein the uplink reference signal is at least one of:
    a sounding reference signal,
    an uplink demodulation reference signal associated with one or more of a physical uplink control channel (PUCCH) or a physical uplink shared channel (PUSCH), or
    a combination thereof.

8. The method of claim 1, wherein the uplink beam is determined based at least in part on a determination that the first node is subject to a transmission limitation due to a maximum permissible exposure condition.

9. The method of claim 8, wherein the first node indicates the maximum permissible exposure condition to the second node.

10. The method of claim 1, wherein the first node is configured to indicate a first quasi co-located beam associated with the uplink beam and a second quasi co-located beam associated with a downlink beam.

11. A method of wireless communication performed by a second node, comprising:
    receiving, from a first node, an indication of a candidate uplink beam and a candidate downlink beam, wherein the candidate uplink beam and the candidate downlink beam are not a reciprocal beam pair, wherein the candidate uplink beam and the candidate downlink beam propagate along different paths, wherein the indication of the candidate uplink beam includes an indication of a reference signal associated with a beam that is quasi co-located with the candidate uplink beam, and wherein the reference signal was previously communicated via the beam;

determining one or more first properties of a first quasi co-located (QCL) beam to be used to configure an uplink beam based at least in part on the indication of the candidate uplink beam;

determining one or more second properties of a second QCL beam to be used to configure a downlink beam based at least in part on the indication of the candidate downlink beam; and transmitting, to the first node, a signaling state that indicates the uplink beam, the one or more first properties of the first QCL beam, the downlink beam, and the one or more second properties of the second QCL beam.

12. The method of claim 11, wherein the signaling state includes a first value that indicates the uplink beam and the one or more first properties of the first QCL beam, and wherein the signaling state includes a second value that indicates the downlink beam and the one or more second properties of the second QCL beam.

13. The method of claim 11, wherein the signaling state is identified using a single table, stored by the second node, that maps signaling state values to properties of quasi co-located beams corresponding to the uplink beam and the downlink beam.

14. The method of claim 11, wherein the signaling state is identified using a first table and a second table stored by the second node, wherein the first table maps first signaling state values to properties of quasi co-located beams corresponding to the uplink beam and the second table maps second signaling state values to properties of quasi co-located beams corresponding to the downlink beam.

15. The method of claim 11, wherein the signaling state is a transmission configuration indication.

16. The method of claim 11, wherein the one or more first properties of the first QCL beam are used to configure the uplink beam and the one or more second properties of the second QCL beam are used to configure the downlink beam.

17. A first node for wireless communication, comprising:
a memory; and
one or more processors operatively coupled to the memory, the memory and the one or more processors configured to:
determine an uplink beam as a candidate for communicating with a second node;
determine a downlink beam as a candidate for communicating with the second node; and
transmit an indication of the uplink beam and the downlink beam to the second node, wherein the uplink beam and the downlink beam are not a reciprocal beam pair, wherein the uplink beam and the downlink beam propagate along different paths, wherein the indication of the uplink beam includes an indication of a reference signal associated with a beam that is quasi co-located with the uplink beam, and wherein the reference signal was previously communicated via the beam.

18. The first node of claim 17, wherein the reference signal is a downlink reference signal.

19. The first node of claim 18, wherein the downlink reference signal is indicated based at least in part on a determination that the first node is in a beam reciprocity condition.

20. The first node of claim 17, wherein the reference signal is an uplink reference signal.

21. The first node of claim 20, wherein the uplink reference signal is indicated based at least in part on a determination that the first node is not in a beam reciprocity condition.

22. The first node of claim 17, wherein the uplink beam is determined based at least in part on a determination that the first node is subject to a transmission limitation due to a maximum permissible exposure condition.

23. The first node of claim 22, wherein the first node indicates the maximum permissible exposure condition to the second node.

24. The first node of claim 17, wherein the first node is configured to indicate a first quasi co-located beam associated with the uplink beam and a second quasi co-located beam associated with a downlink beam.

25. A second node for wireless communication, comprising:
a memory; and
one or more processors operatively coupled to the memory, the memory and the one or more processors configured to:
receive, from a first node, an indication of a candidate uplink beam and a candidate downlink beam, wherein the candidate uplink beam and the candidate downlink beam are not a reciprocal beam pair, wherein the candidate uplink beam and the candidate downlink beam propagate along different paths, wherein the indication of the candidate uplink beam includes an indication of a reference signal associated with a beam that is quasi co-located with the candidate uplink beam, and wherein the reference signal was previously communicated via the beam;
determine one or more first properties of a first quasi co-located (QCL) beam to be used to configure an uplink beam based at least in part on the indication of the candidate uplink beam;
determine one or more second properties of a second QCL beam to be used to configure a downlink beam based at least in part on the indication of the candidate downlink beam; and
transmit, to the first node, a signaling state that indicates the uplink beam, the one or more first properties of the first QCL beam, the downlink beam, and the one or more second properties of the second QCL beam.

26. The second node of claim 25, wherein the signaling state includes a first value that indicates the uplink beam and the one or more first properties of the first QCL beam, and wherein the signaling state includes a second value that indicates the downlink beam and the one or more second properties of the second QCL beam.

27. The second node of claim 25, wherein the signaling state is identified using a single table, stored by the second node, that maps signaling state values to properties of quasi co-located beams corresponding to the uplink beam and the downlink beam.

28. The second node of claim 25, wherein the signaling state is identified using a first table and a second table stored by the second node, wherein the first table maps first signaling state values to properties of quasi co-located beams corresponding to the uplink beam and the second table maps second signaling state values to properties of quasi co-located beams corresponding to the downlink beam.

29. An apparatus comprising:
means for determining an uplink beam for communicating with a different apparatus;
means for determining a downlink beam as a candidate for communicating with the different apparatus; and
means for transmitting an indication of the uplink beam and the downlink beam to the different apparatus, wherein the uplink beam and the downlink beam are not a reciprocal beam pair, wherein the uplink beam and the downlink beam propagate along different paths, wherein the indication of the uplink beam includes an indication of a reference signal associated with a beam that is quasi co-located with the uplink beam, and wherein the reference signal was previously communicated via the beam.

30. The apparatus of claim 29, wherein the reference signal is a downlink reference signal.

31. The apparatus of claim 29, wherein the reference signal is a synchronization signal block.

32. An apparatus comprising:
means for receiving an indication of a candidate uplink beam and a candidate downlink beam, wherein the candidate uplink beam and the candidate downlink beam are not a reciprocal beam pair, wherein the candidate uplink beam and the candidate downlink beam propagate along different paths, wherein the indication of the candidate uplink beam includes an indication of a reference signal associated with a beam that is quasi co-located with the candidate uplink beam, and wherein the reference signal was previously communicated via the beam;
means for determining one or more first properties of a first quasi co-located (QCL) beam to be used to configure an uplink beam based at least in part on the indication of the candidate uplink beam;
means for determining one or more second properties of a second QCL beam to be used to configure a downlink beam based at least in part on the indication of the candidate downlink beam; and
means for transmitting a signaling state that indicates the uplink beam, the one or more first properties of the first QCL beam, the downlink beam, and the one or more second properties of the second QCL beam.

33. The apparatus of claim 32, wherein the signaling state includes a first value that indicates the uplink beam and the one or more first properties of the first QCL beam, and wherein the signaling state includes a second value that indicates the downlink beam and the one or more second properties of the second QCL beam.

34. The apparatus of claim 32, wherein the signaling state is identified using a single table that maps signaling state values to properties of quasi co-located beams corresponding to the uplink beam and the downlink beam.

35. A non-transitory computer-readable medium storing one or more instructions for wireless communication, the one or more instructions comprising:
one or more instructions that, when executed by one or more processors of a first node, cause the one or more processors to:
determine an uplink beam as a candidate for communicating with a second node;
determine a downlink beam as a candidate for communicating with the second node; and
transmit an indication of the uplink beam and the downlink beam to the second node, wherein the uplink beam and the downlink beam are not a reciprocal beam pair, wherein the uplink beam and the downlink beam propagate along different paths, wherein the indication of the uplink beam includes an indication of a reference signal associated with a beam that is quasi co-located with the uplink beam, and wherein the reference signal was previously communicated via the beam.

36. The non-transitory computer-readable medium of claim 35, wherein the reference signal is a synchronization signal block.

37. A non-transitory computer-readable medium storing one or more instructions for wireless communication, the one or more instructions comprising:
one or more instructions that, when executed by one or more processors of a second node, cause the one or more processors to:
receive, from a first node, an indication of a candidate uplink beam and a candidate downlink beam, wherein the candidate uplink beam and the candidate downlink beam are not a reciprocal beam pair, wherein the candidate uplink beam and the candidate downlink beam propagate along different paths, wherein the indication of the candidate uplink beam includes an indication of a reference signal associated with a beam that is quasi co-located with the candidate uplink beam, and wherein the reference signal was previously communicated via the beam;
determine one or more first properties of a first quasi co-located (QCL) beam to be used to configure an uplink beam based at least in part on the indication of the candidate uplink beam;
determine one or more second properties of a second QCL beam to be used to configure a downlink beam based at least in part on the indication of the candidate downlink beam; and
transmit, to the first node, a signaling state that indicates the uplink beam, the one or more first properties of the first QCL beam, the downlink beam, and the one or more second properties of the second QCL beam.

38. The non-transitory computer-readable medium of claim 37, wherein the signaling state includes a first value that indicates the uplink beam and the one or more first properties of the first QCL beam, and wherein the signaling state includes a second value that indicates the downlink beam and the one or more second properties of the second QCL beam.

* * * * *